(12) United States Patent
Zhang et al.

(10) Patent No.: US 8,885,669 B2
(45) Date of Patent: Nov. 11, 2014

(54) METHOD AND APPARATUS FOR PROCESSING A PREAMBLE OF A PACKET

(75) Inventors: Hongyuan Zhang, Sunnyvale, CA (US); Rohit U. Nabar, Sunnyvale, CA (US); Songping Wu, Cupertino, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 39 days.

(21) Appl. No.: 13/456,941

(22) Filed: Apr. 26, 2012

(65) Prior Publication Data

US 2012/0207181 A1 Aug. 16, 2012

Related U.S. Application Data

(62) Division of application No. 12/467,010, filed on May 15, 2009, now Pat. No. 8,175,119.

(60) Provisional application No. 61/053,526, filed on May 15, 2008, provisional application No. 61/078,925,
(Continued)

(51) Int. Cl.
*H04J 3/24* (2006.01)
*H04L 27/26* (2006.01)
*H04J 13/10* (2011.01)
*H04J 13/00* (2011.01)
*H04B 1/707* (2011.01)

(52) U.S. Cl.
CPC ............ *H04B 1/707* (2013.01); *H04L 27/2613* (2013.01); *H04J 13/10* (2013.01); *H04J 13/0014* (2013.01); *H04L 27/262* (2013.01)
USPC ............................. 370/474; 370/476; 370/203

(58) Field of Classification Search
USPC ......... 370/476, 203, 328, 350, 464, 465, 471, 370/474
See application file for complete search history.

(56) References Cited

U.S. PATENT DOCUMENTS 4,616,622 A * 10/1986 Milliman ........................ 124/73
6,839,876 B1 1/2005 Tong et al.
(Continued)

FOREIGN PATENT DOCUMENTS

| JP | 2010-532302 A | 10/2010 |
|---|---|---|
| WO | WO-2009/059229 A1 | 5/2009 |
| WO | WO-2009/084885 A2 | 7/2009 |

OTHER PUBLICATIONS

Invitation to Pay Additional Fees/and partial International Search Report for Application No. PCT/US2009/044160 mailed Aug. 6, 2009.
(Continued)

*Primary Examiner* — Kwang B Yao
*Assistant Examiner* — Nguyen Ngo

(57) ABSTRACT

A method for processing a preamble of a data packet, received via a communication channel, using a pair of complementary sequences, wherein a sum of out-of-phase aperiodic autocorrelation coefficients of the pair of complementary sequences is zero, and wherein the preamble includes a first field that provides synchronization information and a second field that provides channel estimation information, includes at least one of (i) correlating a received signal corresponding to the preamble with at least one sequence of the pair of complementary sequences to generate a plurality of respective correlation signals, or (ii) autocorrelating the received signal to generate an autocorrelation signal. The method also includes determining a cover code in the preamble using at least one of (i) the plurality of respective correlation signals, or (ii) the autocorrelation signal. The method also includes using the cover code to decode the preamble.

20 Claims, 36 Drawing Sheets

Related U.S. Application Data filed on Jul. 8, 2008, provisional application No. 61/080,514, filed on Jul. 14, 2008, provisional application No. 61/084,133, filed on Jul. 28, 2008, provisional application No. 61/084,776, filed on Jul. 30, 2008, provisional application No. 61/085,763, filed on Aug. 1, 2008, provisional application No. 61/090,058, filed on Aug. 19, 2008, provisional application No. 61/091,885, filed on Aug. 26, 2008, provisional application No. 61/098,128, filed on Sep. 18, 2008, provisional application No. 61/098,970, filed on Sep. 22, 2008, provisional application No. 61/099,790, filed on Sep. 24, 2008, provisional application No. 61/100,112, filed on Sep. 25, 2008, provisional application No. 61/102,152, filed on Oct. 2, 2008.

(56) References Cited

U.S. PATENT DOCUMENTS

| | | | |
|---|---|---|---|
| 7,046,748 B2 | 5/2006 | Jechoux et al. | |
| 7,254,193 B2* | 8/2007 | Jechoux et al. | 375/343 |
| 7,324,428 B1 | 1/2008 | Yang | |
| 7,372,910 B2 | 5/2008 | Suh et al. | |
| 7,616,622 B2 | 11/2009 | Rudolf et al. | |
| 7,860,128 B2 | 12/2010 | Niu et al. | |
| 8,102,925 B2 | 1/2012 | Shoemake | |
| 8,527,853 B2 | 9/2013 | Lakkis | |
| 2002/0064246 A1 | 5/2002 | Kelkar et al. | |
| 2004/0202103 A1 | 10/2004 | Suh et al. | |
| 2005/0195906 A1* | 9/2005 | Showmake | 375/260 |
| 2007/0113159 A1 | 5/2007 | Lakkis | |
| 2008/0165909 A1* | 7/2008 | Amanullah | 375/365 |
| 2008/0298435 A1 | 12/2008 | Lakkis | |
| 2009/0109952 A1 | 4/2009 | Lakkis | |
| 2009/0109955 A1* | 4/2009 | Lakkis | 370/350 |
| 2009/0125792 A1* | 5/2009 | Lakkis | 714/783 |
| 2009/0163143 A1* | 6/2009 | De Rore | 455/63.1 |
| 2009/0175261 A1* | 7/2009 | Oh et al. | 370/350 |
| 2009/0285240 A1 | 11/2009 | Zhang et al. | |
| 2009/0285241 A1 | 11/2009 | Zhang et al. | |
| 2009/0285319 A1 | 11/2009 | Zhang et al. | |
| 2009/0285339 A1 | 11/2009 | Zhang et al. | |
| 2009/0316757 A1* | 12/2009 | ten Brink et al. | 375/135 |
| 2010/0111229 A1 | 5/2010 | Kasher et al. | |
| 2010/0157907 A1* | 6/2010 | Taghavi Nasrabadi et al. | 370/328 |
| 2010/0182979 A1 | 7/2010 | Malladi et al. | |
| 2011/0211653 A1 | 9/2011 | Diaz Fuente et al. | |

OTHER PUBLICATIONS

Funada et al., "A design of single carrier based PHY for IEEE 802.15.3c standard," The 18th Annual IEEE International Symposium on Personal, Indoor and Mobile Radio Communications (PIMRC'07), Institute for Electrical and Electronics Engineers (2007).

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).

IEEE Std 802.11b-1999 (Supplement to ANSI/IEEE Std 802.11, 1999 Edition) "Supplement to IEEE Standard for Information technology—Telecommunications and information exchange between systems-Local and metropolitan area networks-Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

IEEE Std 802.11b-2001 (Corrigendum to IEEE Std 802.11b-1999) "IEEE Standard for Information technology—Telecommunications and information exchange between systems—Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

International Search Report and Written Opinion for International Application No. PCT/US2009/044160 dated Oct. 23, 2009.

Office Action in U.S. Appl. No. 12/466,997 dated Jul. 19, 2011.

Office Action in U.S. Appl. No. 12/467,010 dated Aug. 1, 2011.

International Preliminary Report on Patentability for International Application No. PCT/US2009/044160 dated Nov. 17, 2010.

Notice of Allowance in U.S. Appl. No. 12/466,997 dated Nov. 28, 2011.

Notice of Allowance in U.S. Appl. No. 12/466,997 dated Jan. 10, 2012.

Notice of Allowance in U.S. Appl. No. 12/467,010 dated Nov. 28, 2011.

Notice of Allowance in U.S. Appl. No. 12/467,010 dated Jan. 5, 2012.

Office Action in U.S. Appl. No. 12/467,022 dated Jun. 25, 2012.

Tseng et al., "Complementary Sets of Sequences", IEEE Transactions on Information Theory, vol. 18, No. 5, Sep. 1, 1972, pp. 644-652.

Search Report in EP Application No. 12008566.7 dated Feb. 21, 2013, 8 pages.

Non-Final Notice of Rejection in Japanese Application No. 2011-509752 mailed Jun. 11, 2013.

Harada et al., CoMPA PHY proposal, IEEE 802.15-07-0693-03-003c, May 2007, slides 24-33.

Lakkis et al., "mmWave OFDM Physical Layer Proposal," IEEE 802.15-0760-03-003c, Sep. 2007.

Notice of Reasons for Rejection in JP Application No. 2011-509752 dated Jan. 7, 2014.

Office Action in U.S. Appl. No. 13/771,596 dated Feb. 14, 2014.

* cited by examiner

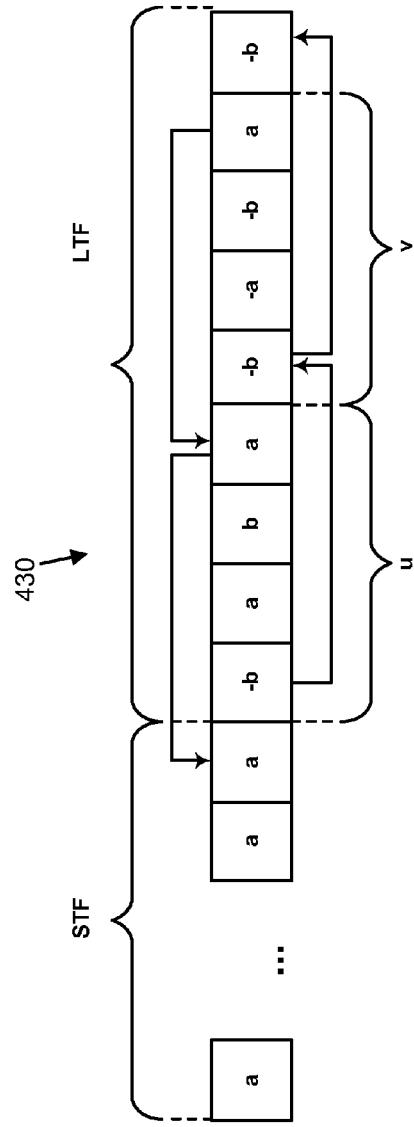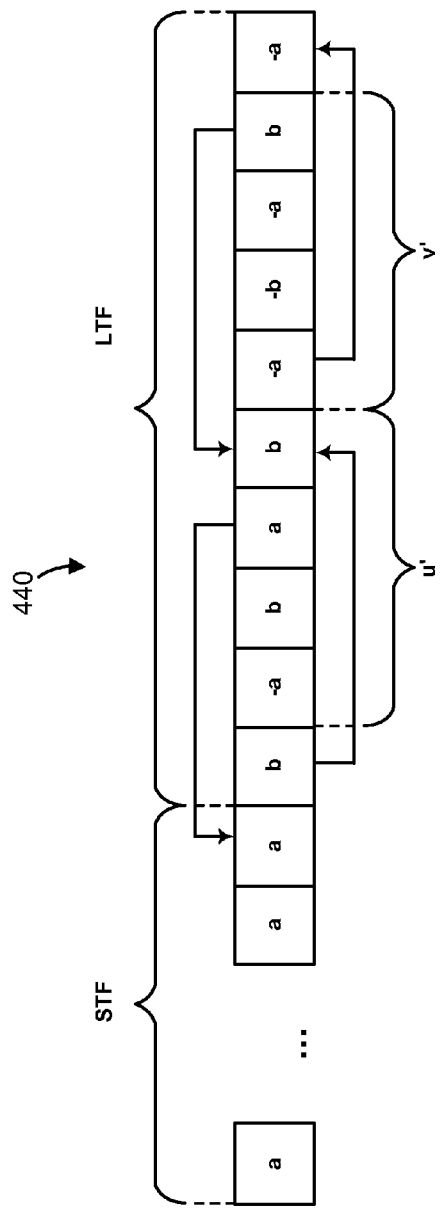

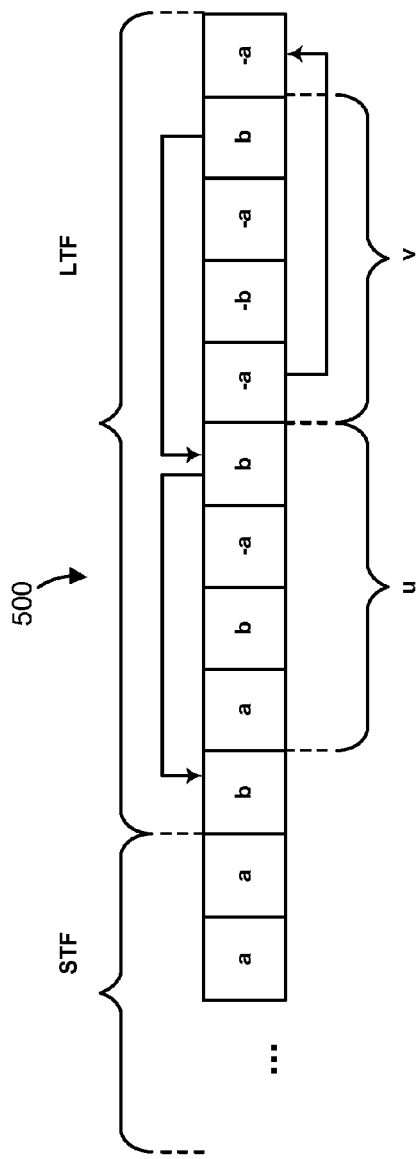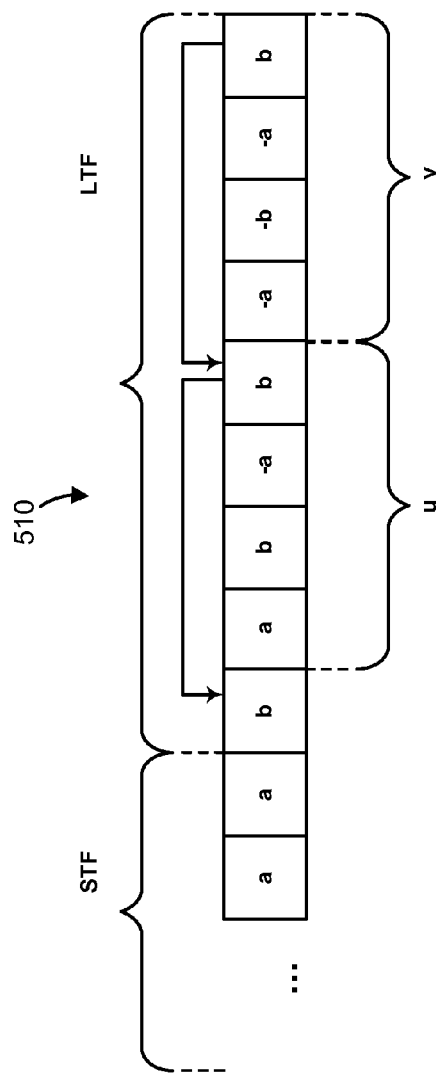

| STF | SFD 1 | LTF |

SC REGULAR

| STF | SFD 2 | LTF |

SC LOW RATE

*FIG. 39*

METHOD AND APPARATUS FOR PROCESSING A PREAMBLE OF A PACKET

CROSS REFERENCE TO RELATED APPLICATIONS

This application is a divisional application of U.S. application Ser. No. 12/467,010, now U.S. Pat. No. 8,175,119, entitled "Efficient Physical Layer Preamble Format," filed on May 15, 2009, which claims the benefit of U.S. Provisional Patent Applications Nos. 61/053,526, filed on May 15, 2008, 61/078,925, filed on Jul. 8, 2008, 61/080,514, filed on Jul. 14, 2008, 61/084,133, filed on Jul. 28, 2008, 61/084,776, filed on Jul. 30, 2008, 61/085,763, filed on Aug. 1, 2008, 61/090,058, filed on Aug. 19, 2008, 61/091,885, filed on Aug. 26, 2008, 61/098,128, filed on Sep. 18, 2008, 61/098,970, filed on Sep. 22, 2008, 61/099,790, filed on Sep. 24, 2008, 61/100,112, filed on Sep. 25, 2008, and 61/102,152, filed on Oct. 2, 2008. The disclosures of the above-referenced applications are hereby incorporated by reference herein in their entireties.

This application is also related to the following commonly-owned patent applications: U.S. patent application Ser. No. 12/466,984, entitled "Efficient Physical Layer Preamble Format" and filed on May 15, 2009, U.S. patent application Ser. No. 12/466,997, entitled "Efficient Physical Layer Preamble Format," filed on May 15, 2009, and issued as U.S. Pat. No. 8,175,118, and U.S. patent application Ser. No. 12/467,022, entitled "Apparatus for Generating Spreading Sequences and Determining Correlation" and filed on May 15, 2009. The disclosures of these related applications are hereby incorporated by reference herein in their entireties.

FIELD OF TECHNOLOGY

The present disclosure relates generally to communication systems and, more particularly, to information formats for exchanging information via communication channels.

BACKGROUND

An ever-increasing number of relatively inexpensive, low power wireless data communication services, networks and devices have been made available over the past number of years, promising near wire speed transmission and reliability. Various wireless technology is described in detail in several IEEE standards documents, including for example, the IEEE Standard 802.11b (1999) and its updates and amendments, as well as the IEEE 802.15.3 Draft Standard (2003) and the IEEE 802.15.3c Draft D0.0 Standard, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, transmission systems compliant with the IEEE 802 standards support one or both of a Single Carrier (SC) mode of operation or an Orthogonal Frequency Division Multiplexing (OFDM) mode of operation to achieve higher data transmission rates. For example, a simple, low-power handheld device may operate only in the SC mode, a more complex device that supports a longer range of operation may operate only in the OFDM mode, and some dual-mode devices may switch between SC and OFDM modes.

Generally speaking, the use of OFDM divides the overall system bandwidth into a number of frequency sub-bands or channels, with each frequency sub-band being associated with a respective subcarrier upon which data may be modulated. Thus, each frequency sub-band of the OFDM system may be viewed as an independent transmission channel within which to send data, thereby increasing the overall throughput or transmission rate of the communication system. During operation, a transmitter operating in the OFDM mode may encode the information bits (which may include error correction encoding and interleaving), spread the encoded bits using a certain spreading sequence, map the encoded bits to symbols of a 64 quadrature amplitude modulation (QAM) multi-carrier constellation, for example, and transmit the modulated and upconverted signals after appropriate power amplification to one or more receivers, resulting in a relatively high-speed time domain signal with a large peak-to-average ratio (PAR).

Likewise, the receivers generally include a radio frequency (RF) receiving unit that performs correlation and demodulation to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

Specifically with respect to wideband wireless communication systems that operate in the 60 GHz band, the IEEE 802.15.3c Draft D0.0 Standard ("the Proposed Standard") proposes that each packet transmitted via a communication channel include a preamble to provide synchronization and training information; a header to provide the basic parameters of the physical layer (PHY) such as length of the payload, modulation and coding method, etc.; and a payload portion. A preamble consistent with the Proposed Standard includes a synchronization field (SYNC) to indicate the beginning of a block of transmitted information for signal detection, a start frame delimiter (SFD) field to signal the beginning of the actual frame, and a channel estimation sequence (CES). These fields can carry information for receiver algorithms related to automatic gain control (AGC) setting, antenna diversity selection or phase array setting, timing acquisition, coarse frequency offset estimation, channel estimation, etc. For each of the SC and OFDM modes of operation, the Proposed Standard specifies a unique PHY preamble structure, i.e., particular lengths of SYNC, SFD, and CES fields as well as spreading sequences and cover codes (sequences of symbols transmitted using the corresponding spreading sequences) for each PHY preamble field.

In addition to being associated with separate structures in SC and OFDM modes, the frame of a PHY preamble consistent with the Proposed Standard fails to address other potential problems such as low sensitivity, for example. In particular, the receiver of a PHY preamble may use either a coherent or a noncoherent method to detect the beginning of the SFD field and accordingly establish frame timing. In general, the coherent method requires channel estimation based on the signal in the SYNC field, which may be performed in an adaptive fashion. However, the SYNC signal may be too short for channel estimation adaptation to converge to a reliable value. On the other hand, the noncoherent method is not based on channel estimation and is generally simpler. However, the noncoherent method is associated with low sensitivity, i.e., frame timing accuracy may be poor at low signal-to-noise (SNR) levels. Because frame timing is critical to receiving the entire packet, low sensitivity in frame timing detection significantly limits overall performance.

SUMMARY

In one embodiment, a method for processing a preamble of a data packet, received via a communication channel, using a pair of complementary sequences, wherein a sum of out-of-phase aperiodic autocorrelation coefficients of the pair of complementary sequences is zero, and wherein the preamble includes a first field that provides synchronization information and a second field that provides channel estimation information, includes at least one of (i) correlating a received signal corresponding to the preamble with at least one sequence of the pair of complementary sequences to generate a plurality of respective correlation signals, or (ii) autocorrelating the received signal to generate an autocorrelation signal. The method also includes determining a cover code in the preamble using at least one of (i) the plurality of respective correlation signals, or (ii) the autocorrelation signal. The method also includes using the cover code to decode the preamble.

In various implementations, one or more of the following features may be included. The cover code may be in the first field. The cover code may indicate at least one of (i) a piconet identity, (ii) a header rate, or (iii) one of a single carrier (SC) mode or an orthogonal frequency division multiplexing (OFDM) mode. The cover code may be in the second field. The method may further include determining a beginning of the second field based on the plurality of respective correlation signals or the autocorrelation signal. Each of the pair of complementary sequences may be a 128-chip Golay spreading sequence associated with a weight vector W and a delay vector D, W may be equal to [1 1 −1 1 −1 1 −1], and D may be one of [1 2 4 8 16 32 64], [64 16 32 1 8 2 4], or [64 32 16 8 4 2 1]. The method may further include detecting a first channel estimation (CES) symbol in the second field and detecting a second CES symbol in the second field, and the first CES symbol and the second CES symbol may be complementary sequences. A length of each sequence of the pair of complementary sequences may be an integer N, and a length of each of the first CES symbol and the second CES symbol may be at least 4N. The first CES symbol may be u consistent with the format $u=[_{c_1}a\ _{c_2}b\ _{c_3}a\ _{c_4}b]$, the second CES symbol may be v consistent with the format $v=[c_5a\ c_6b\ c_6a\ c_8b]$, a may be a first Golay spreading sequence, b may be a second Golay spreading sequence complementary to a, each of $c_1, c_2, c_3, c_4, c_5, c_6, c_7$, and $c_8$ may be +1 or −1, $c_4$ may be equal to $c_8$, and u and v may be complementary Golay sequences. An ending portion of the first CES symbol may serve as a cyclic prefix of the second CES symbol, and/or a beginning portion of the second CES symbol may serve as a cyclic postfix of the first CES symbol.

In another embodiment, a device configured to receive, via a communication channel, a data packet having a preamble that includes a first field that provides synchronization information and a second field that provides channel estimation information, includes a processor. The processor is configured to, at least one of, (i) correlate a received signal corresponding to the preamble with at least one sequence of a pair of complementary sequences to generate a plurality of respective correlation signals, wherein a sum of out-of-phase aperiodic autocorrelation coefficients of the pair of complementary sequences is zero, or (ii) autocorrelate the received signal to generate an autocorrelation signal. The processor is also configured to determine a cover code in the preamble using at least one of (i) the plurality of respective correlation signals, or (ii) the autocorrelation signal, and to use the cover code to decode the preamble.

In various implementations, one or more of the following features may be included. The cover code may be in the first field. The cover code may indicate at least one of (i) a piconet identity, (ii) a header rate, or (iii) one of a single carrier (SC) mode or an orthogonal frequency division multiplexing (OFDM) mode. The cover code may be in the second field. The processor may be further configured to determine a beginning of the second field based on the plurality of respective correlation signals or the autocorrelation signal. Each of the pair of complementary sequences may be a 128-chip Golay spreading sequence associated with a weight vector W and a delay vector D, W may be equal to [1 1 −1 1 −1 1 −1], and D may be one of [1 2 4 8 16 32 64], [64 16 32 1 8 2 4], or [64 32 16 8 4 2 1]. The processor may be further configured to detect a first channel estimation (CES) symbol in the second field and detect a second CES symbol in the second field, and the first CES symbol and the second CES symbol may be complementary sequences. A length of each sequence of the pair of complementary sequences may be an integer N, and a length of each of the first CES symbol and the second CES symbol may be at least 4N. The first CES symbol may be u consistent with the format $u=[c_1a\ c_2b\ c_3a\ c_4b]$, the second CES symbol may be v consistent with the format $v=[c_5a\ c_6b\ c_6a\ c_8b]$, a may be a first Golay spreading sequence, b may be a second Golay spreading sequence complementary to a, each of $c_1, c_2, c_3, c_4, c_5, c_6, c_7$, and $c_8$ may be +1 or −1, $c_4$ may be equal to $c_8$, and u and v may be complementary Golay sequences. An ending portion of the first CES symbol may serve as a cyclic prefix of the second CES symbol, and/or a beginning portion of the second CES symbol may serve as a cyclic postfix of the first CES symbol.

BRIEF DESCRIPTION OF THE DRAWINGS

FIG. 15 is a block diagram of an efficient PHY preamble with four-period CES symbols in which the last period of the short training field corresponds to the cyclic prefix of the first CES symbol in the long training field, and the first period of the second CES symbol corresponds to the cyclic postfix of the first CES symbol;

FIG. 16 is a block diagram of an efficient PHY preamble that includes a frame delimiter that corresponds to the cyclic prefix of the first CES symbol of the long training field;

FIG. 22 is a block diagram of the efficient PHY preamble of FIG. 16 that uses other CES symbols in the long training field;

FIG. 23 is a block diagram of the efficient PHY preamble of FIG. 22 in which the cyclic postfix of the second CES symbol is omitted;

FIG. 39 is a block diagram of a PHY preamble in which the length of the LTF field is different for different PHY communication modes;

DETAILED DESCRIPTION

Figure 1:
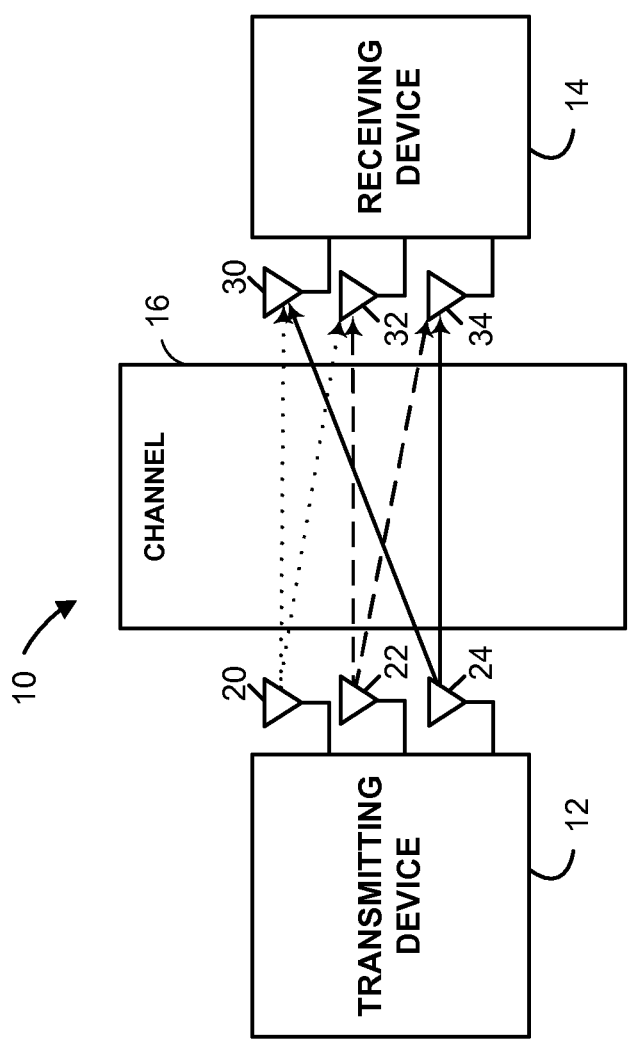
FIG. 1 is a block diagram of a communication system including a transmitter and a receiver that may communicate using efficient PHY preambles.

FIG. 1 is a block diagram of an example wireless communication system 10 in which devices, such as a transmitting device 12 and a receiving device 14, may transmit and receive data packets via a shared wireless communication channel 16.

In one embodiment, the devices 12 and 14 may communicate according to a communication protocol that utilizes an efficient PHY preamble format as described in greater detail below. Each of the devices 12 and 14 may be, for example, a mobile station or a non-mobile station equipped with a set of one or more antennas 20-24 and 30-34, respectively. Although the wireless communication system 10 illustrated in FIG. 1 includes two devices 12, 14, each with three antennas, the wireless communication system 10 may, of course, include any number of devices, each equipped with the same or a different number of antennas (e.g., 1, 2, 3, 4 antennas and so on).

Also, it will be noted that although the wireless communication system 10 illustrated in FIG. 1 includes a transmitting device 12 and a receiving device 14, devices in the wireless communication system 10 may generally operate in multiple modes (e.g., a transmit mode and a receive mode). Accordingly, in some embodiments, antennas 20-24 and 30-34 may support both transmission and reception. Alternatively or additionally, a given device may include separate transmit antennas and separate receive antennas. It will be also understood that because each of the devices 12 and 14 may have a single antenna or multiple antennas, the wireless communication system 10 may be a multiple input, multiple output (MIMO) system, a multiple input, single output (MISO) system, a single input, multiple output (SIMO) system, or a single input, single output (SISO) system.

Figure 2:
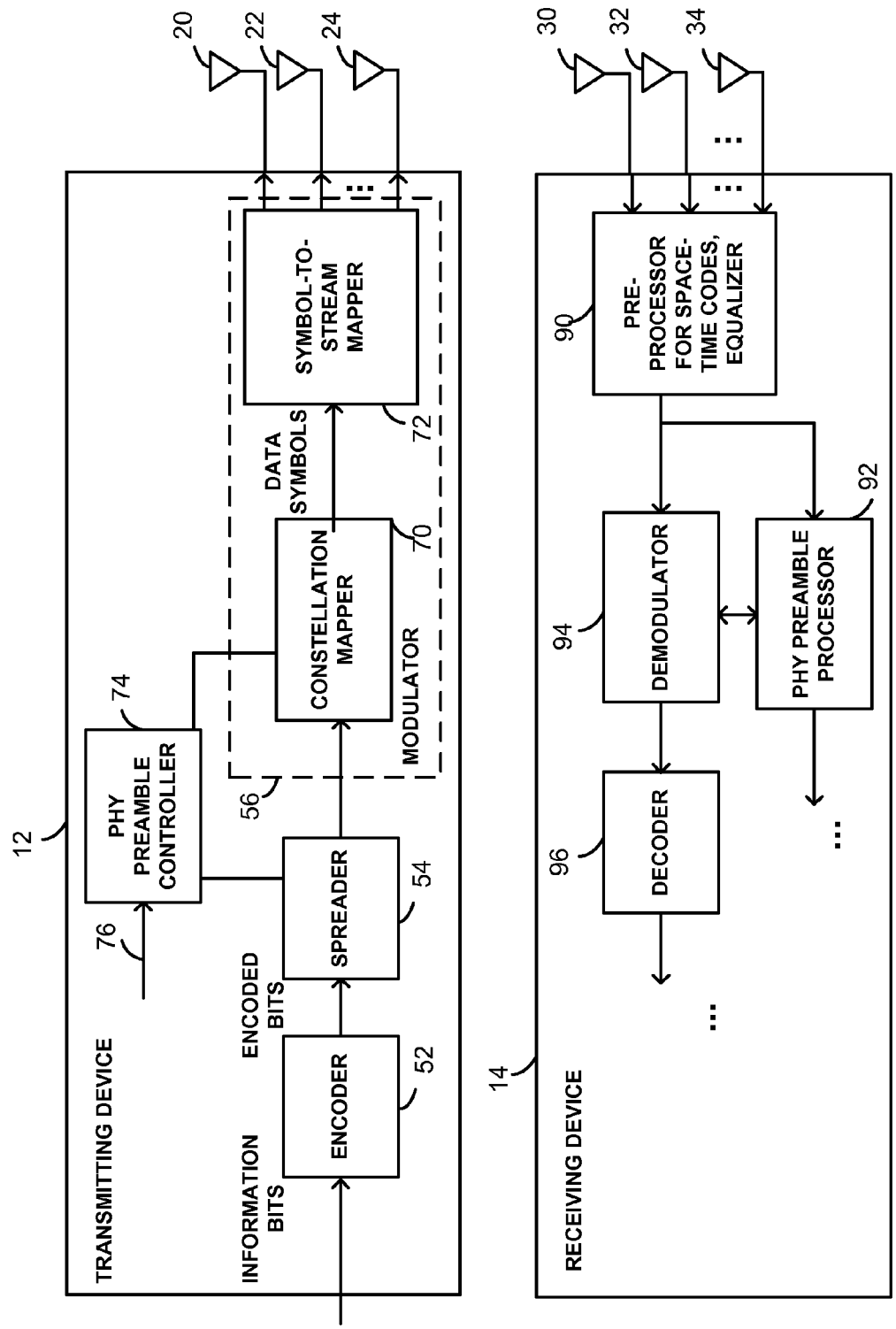
FIG. 2 depicts block diagrams of a transmitter and a receiver that may operate in the system of in FIG. 1.

FIG. 2 illustrates, in relevant part, the architectures of the transmitting device 12 and the receiving device 14. The transmitting device 12 may generally convert a sequence of information bits into signals appropriate for transmission through a wireless channel (e.g., channel 16 of FIG. 1). More specifically, the transmitting device 12 may include an encoder 52 (e.g., a convolution encoder) that encodes information bits, a spreader 54 that converts each encoded bit to a sequence of chips, and a modulator 56 that modulates the encoded chips into data symbols, which are mapped and converted to signals appropriate for transmission via one or more transmit antennas 20-24. In general, the modulator 56 may implement any desired modulation techniques based on one or more of phase shift keying, binary phase-shift keying (BPSK), π/2 BPSK (in which modulation is rotated by π/2 for each symbol or chip so that the maximum phase shift between adjacent symbols/chips is reduced from 180° to 90°), quadrature phase-shift keying (QPSK), π/2 QPSK, frequency modulation, amplitude modulation, quadrature amplitude modulation (QAM), π/2 QAM, on-off keying, minimum-shift keying, Gaussian minimum-shift keying, dual alternative mark inversion (DAMI), etc In some embodiments, the modulator 56 may include a bit-to-symbol mapper 70 that maps encoded bits into symbols, and a symbol-to-stream mapper 72 that maps the symbols into multiple parallel streams. If only one transmit antenna is utilized, the symbol-to-stream mapper 72 may be omitted. Information is transmitted in data units such as packets. Such data units typically include a PHY preamble and a PHY payload. To generate the PHY preamble, a PHY preamble controller 74 receives controls parameters via a control input 76 and sends commands to the spreader 54 and, optionally, the modulator 56, as discussed in more detail below. The transmitting device 50 may include various additional modules that, for purposes of clarity and conciseness, are not illustrated in FIG. 2. For example, the transmitting device 50 may include an interleaver that interleaves the encoded bits to mitigate burst errors. The transmitting device 50 may further include a radio frequency (RF) front end for performing frequency upconversion, various filters, power amplifiers, and so on.

The receiving device 14 may include a pre-processor for space-time processing and equalizer 90 coupled to one or more receive antennas 30-34, a PHY preamble processor 92, a demodulator 94, and a decoder 96. The unit 90 may include an equalizer. It will be understood that the receiving device 14 may also include other components such as filters, analog-to-digital converters, etc. that are omitted from FIG. 2 for the purposes of clarity and conciseness. The preamble processor 92 may process the received signal in co-operation with the demodulator 94.

In some embodiments, the devices 12 and 14 may communicate using an efficiently formatted PHY preamble that includes the information included in the PHY preamble specified by the IEEE 802.15.3c Draft D0.0 Standard, but is of a shorter duration. In some embodiments, the devices 12 and 14 convey additional information via the PHY preamble (e.g., PHY communication mode, piconet id, etc.). Further, the devices 12 and 14 may use a common preamble in different modes of operation (e.g., SC mode and OFDM mode).

Figure 3:
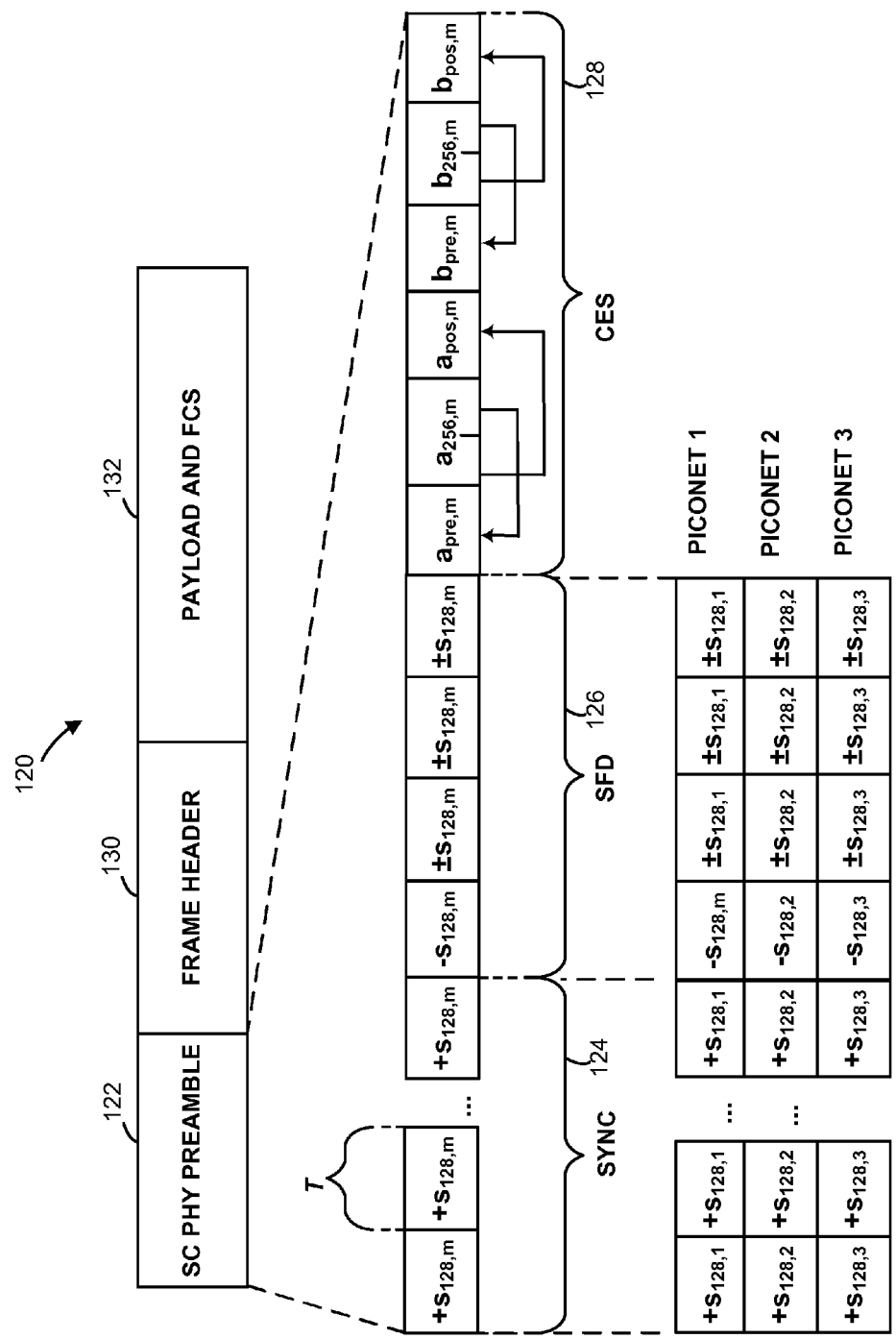
FIG. 3 is a block diagram of a prior art PHY preamble for the SC communication mode.

To better illustrate the techniques of efficient PHY preamble formatting, prior art formats for SC and OFDM PHY preambles in the IEEE 802.15.3c Draft D0.0 Standard, as well as several relevant concepts related to wireless communications, are first discussed with reference to FIGS. 3 and 4. FIG. 3 is a diagram of a SC mode packet 120 that includes an SC PHY preamble 122 having a SYNC field 124, an SFD field 126, and a CES field 128; a frame header 130; and a payload with a frame check sequence (FCS) 132. As indicated above, receivers generally use the PHY preamble for AGC setting, antenna diversity selection or phase array setting, timing acquisition, coarse frequency offset estimation, packet and frame synchronization, and channel estimation. The SYNC field 132 of the PHY preamble 122 has n periods, each of time T, during each of which a 128-chip preamble sequence (or "code") $s_{128,m}$ is transmitted with a positive or negative polarity. In general, the time of transmission of a preamble sequence may be T. In some embodiments, the length of transmission of a preamble sequence may be less than T.

Depending on the modulation scheme, one, two, four, or other numbers of data bits or chips may be mapped to a single symbol. For example, BPSK modulation maps each binary digit to one of two symbols, while QPSK maps each pair of binary digits to one of four symbols or constellation points. For example, a {0,0} bit tuple may be mapped to a first constellation point, a [0,1] bit tuple may be mapped to a second constellation point, a [1,0] bit tuple may be mapped to a third constellation point, and a [1,1] bit tuple may be mapped to a fourth constellation point. Thus, QPSK defines four symbols, and each symbol may correspond to a particular combination of two binary digits. Other modulation schemes such as 8-QAM, 16-QAM, 32-QAM, 64-QAM etc., may also be utilized.

According to the IEEE 802.15.3c Draft D0.0 Standard, the sequences $s_{128,m}$ are modulated using a π/2 binary phase-shift keying (BPSK) scheme. In the π/2 BPSK scheme, each chip is mapped to one of two symbols that are 180° apart, and the modulation scheme rotates counterclockwise by π/2 each chip. For instance, a first chip in the sequence may be mapped to one of −1 or +1, whereas the next chip in the sequence is mapped to one of +j or −j. The sequences $s_{128,m}$ and $-s_{128,m}$ may be viewed as binary complements of each other. Also, the modulated signals corresponding to the sequences $+s_{128,m}$ and $-s_{128,m}$ will have a 180° phase shift with respect to each other.

Referring again to FIG. 3, in the notation $s_{128,m}$, the subscript m is an index of one of several available sequences $s_{128}$. In particular, three sequences, $s_{128,1}$, $s_{128,2}$, and $s_{128,3}$, are specified for SC mode, with each of the sequences corresponding to a respective piconet id. Once selected, the same spreading sequence is applied in every period of the fields SYNC 124 and SFD 126, as illustrated in FIG. 3.

As used herein, the term "cover code" refers to how a series of preamble sequences are augmented to form a longer sequence. For example, for a sequence [+a, −a, +a, −a], where a is a preamble code, the cover code may be represented as [+1, −1, +1, −1], where −1 may indicate that the binary complement of the code a is utilized, or that the modulated signal corresponding to code −a is phase shifted by 180° with respect to the modulated signal corresponding to code +a. In this example [+a, −a, +a, −a], the cover code could be represented differently, such as [1, 0, 1, 0], where 0 indicates that −a is utilized. In some embodiments, the longer sequence can be formed by spreading the cover code by one or more preamble sequences. For instance, the sequence [+a, −a, +a, −a] could be generated by spreading the cover code [+1, −1, +1, −1] (or [1, 0, 1, 0]) by the preamble (or spreading) code a. Similarly, a sequence [+a, −b, −a, +a] could be generated by spreading a cover code [+1, −1, −1, +1] (or [1, 0, 0, 1]) by the preamble (or spreading) code a and a preamble (or spreading) code b. In other words, +a could be generated by spreading +1 with a, −b could be generated by spreading −1 with b, and so on. Referring again to FIG. 3, the cover code for the SYNC field 124 may be represented as [+1, +1, . . . +1]. The cover code for the SFD field 126 is a sequence with a length of four. It may vary depending on the particular preamble that is to be transmitted (e.g., one of two different lengths for the CES field 128, and one of four different header spreading factors), but it always begins with −1 (or some other indicator, such as 0, to indicate that the code $-s_{128,m}$ is to be utilized).

With continued reference to FIG. 3, the CES field 128 includes 256-chip complementary Golay sequences $a_{256,m}$ and $b_{256,m}$. To reduce the effect of inter-symbol interference (ISI), the sequences $a_{256,m}$ and $b_{256,m}$ are preceded by respective cyclic prefixes ($a_{pre,m}$ and $b_{pre,m}$, copies of the last 128 chips of the corresponding sequence) and followed by respective postfixes ($a_{pos,m}$ and $b_{pos,m}$, copies of the first 128 chips of the corresponding sequence).

Figure 4:
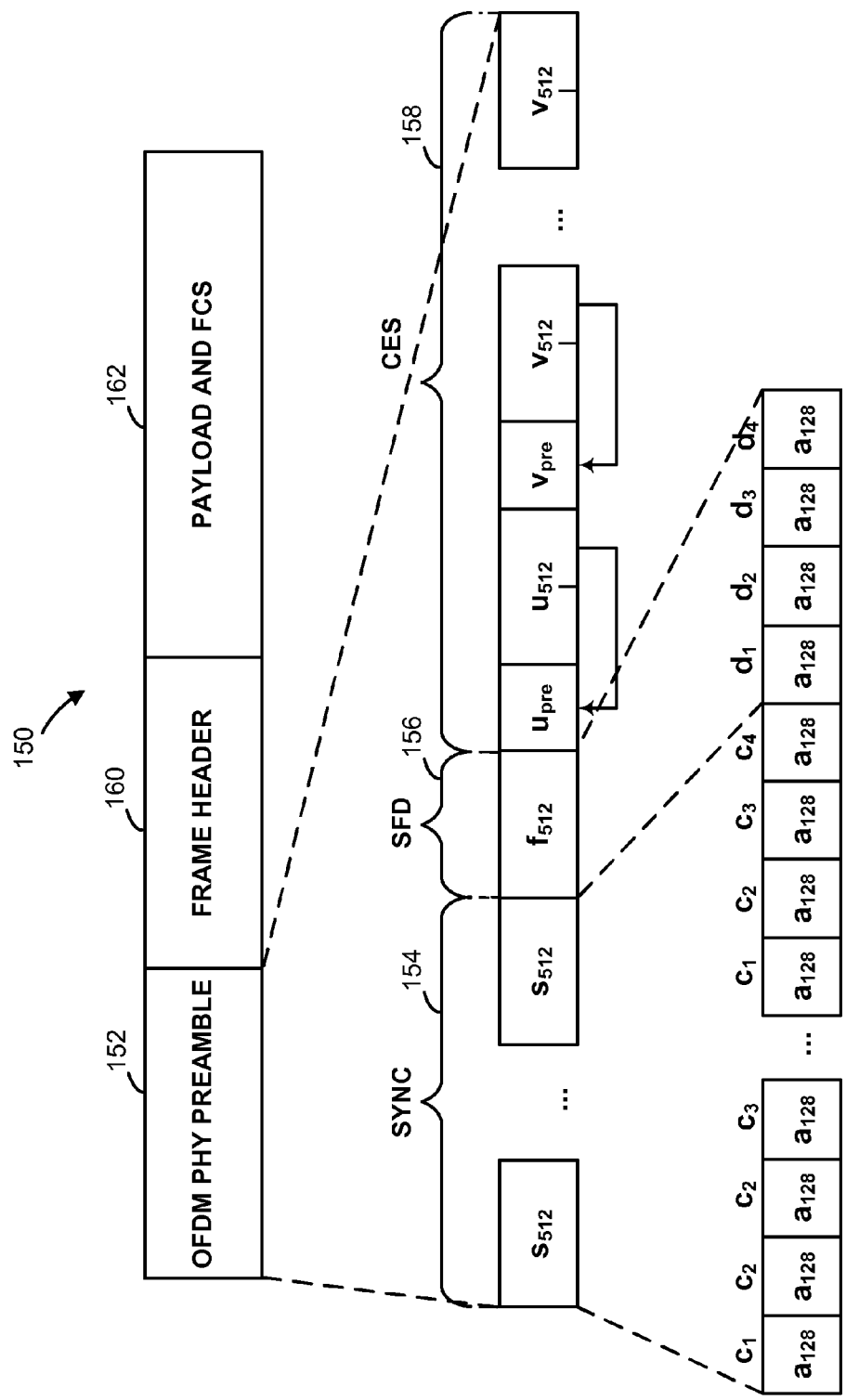
FIG. 4 is a block diagram of a prior art PHY preamble for the OFDM communication mode.

FIG. 4 is a diagram of an OFDM mode packet 150 that includes an OFDM PHY preamble 152 having a SYNC field 154, an SFD field 156, and a CES field 158; a frame header 160; and a payload with a frame check sequence (FCS) 162. During each period of the SYNC field 154, a sequence $s_{512}$ is transmitted. Each sequence $s_{512}$ corresponds to four 128-chip preamble sequences $a_{128}$ augmented according to a cover code [$c_1, c_2, c_3, c_4$]. Similarly, he SFD field 156 is a sequence $f_{512}$ that corresponds to four sequences $a_{128}$, but augmented according to a cover code [$d_1, d_2, d_3, d_4$]. The CES field 158 comprises 512-chip sequences $u_{512}$ and $v_{512}$ and corresponding prefixes ($u_{pre}$ and $v_{pre}$). The entire packet 150 is OFDM modulated.

As can be seen in FIGS. 3 and 4, different preamble formats are utilized for SC mode packets and OFDM mode packets. Additionally, the preambles in the SC mode and the OFDM mode are modulated differently. The present application discloses embodiments of efficient PHY preamble formats and techniques for formatting and processing such PHY preambles that permit a common preamble format to be utilized for both SC mode packets and OFDM mode packets. Further, in some embodiments, efficient PHY preamble formats allow devices to detect boundaries of and/or between preamble fields (e.g., detecting the beginning of the CES field) based on signal correlation and without relying on cover codes. Moreover, in some embodiments, the SFD field may be entirely omitted in the PHY preamble if desired. In some embodiments, the efficient PHY preamble of the present disclosure includes a short training field (STF) generally associated with synchronization information, followed by a long training field (LTF) generally associated with channel estimation information. Still further, in some embodiments, efficient PHY preamble formatting allows certain preamble sequences to fulfill multiple functions, and thereby reduce the overall length of the PHY preamble. For example, a preamble sequence may serve as both a cyclic prefix of a CES symbol and a field delimiter. In some embodiments, an efficient PHY preamble may signal additional information using CES sequence ordering.

Referring again to FIG. 2, the PHY preamble controller 74 of the transmitter 12 generally controls the generation of the PHY preamble. Similarly, the PHY preamble processor 92 of the receiver 14 generally analyzes the PHY preamble to, for example, identify the location of fields and/or field boundaries in the PHY preamble, decode information encoded in the PHY preamble, etc. The PHY preamble controller 74 is discussed in detail with reference to FIG. 5, followed by a discussion of the PHY preamble processor 92 with reference to FIG. 6.

Figure 5:
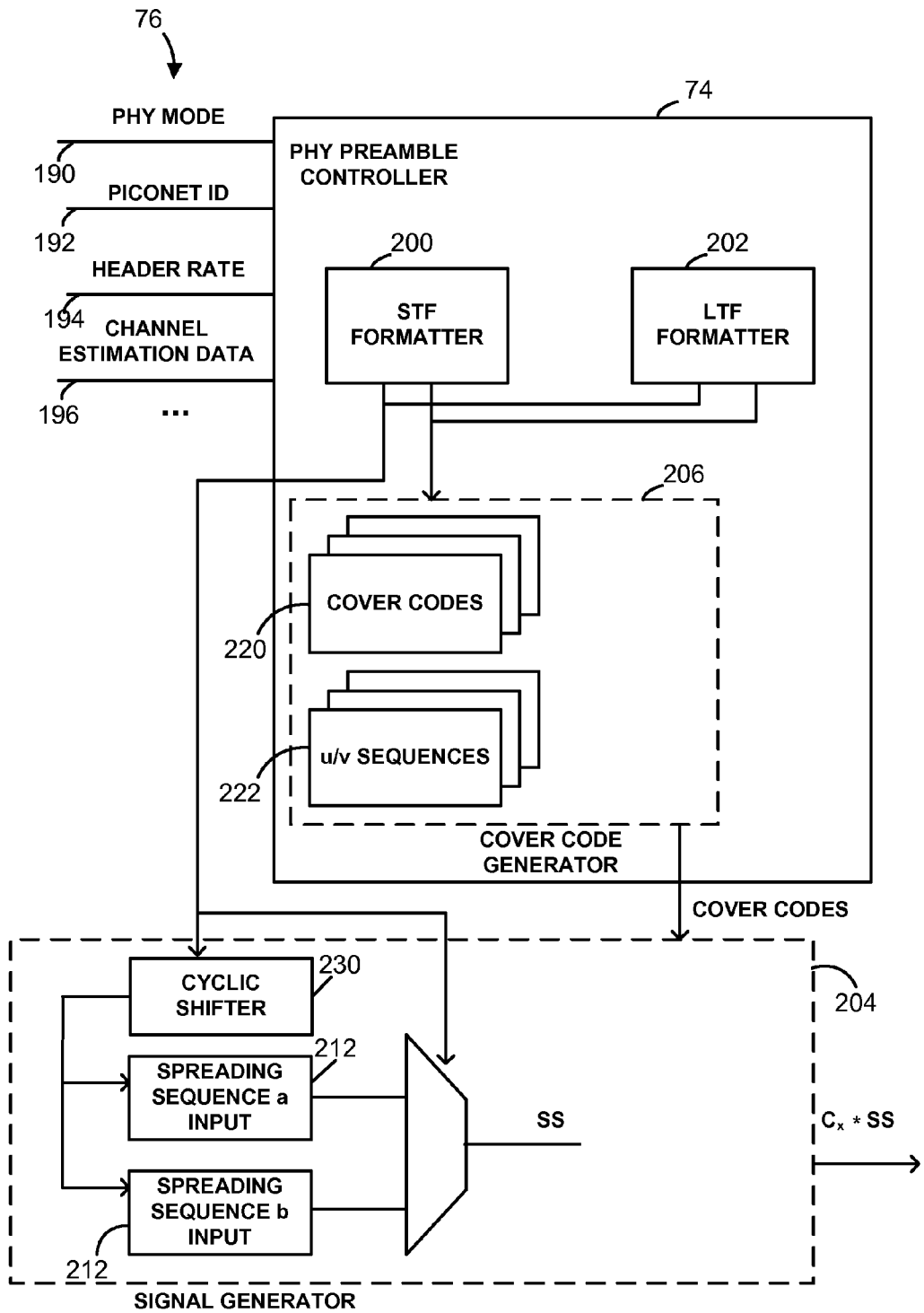
FIG. 5 is a block diagram of an example PHY preamble controller that generates an efficient PHY preamble.

Referring to FIG. 5, the PHY preamble controller 74 may receive various input parameters via the control input 76. In one embodiment, the input parameters may include a PHY mode selector 190 to indicate, for example, one of various SC and OFDM modes of communication; a piconet identifier selector 192 to receive piconet information; a header rate identifier 194 to receive, for example, an indication of a rate (e.g., SC (Regular) rate or SC Low Rate Common Mode rate); channel estimation parameters 196; etc. In some embodiments, the control input 76 may be coupled to a processor such as a PHY processor, other components servicing higher layers of the communication protocol, etc. The PHY preamble controller 74 may include an STF formatter 200 and an LTF formatter 202, each of which may be implemented using hardware, a processor executing machine readable instructions, or combinations thereof. Each of the formatters 200 and 202 is communicatively coupled to at least a signal generator 204 and a cover code generator 206. Although FIG. 5 does not depict connections between the formatters 200-202 and the input signals 190-196, the formatters 200-202 may be responsive to at least some of the signals of the control input 76.

The signal generator 204 generally receives cover codes and indications of when to generate signals using either a chip sequence a or a chip sequence b from the STF formatter 200, the LTF formatter 202 and the cover code generator 206. The chip sequences a and b are complementary sequences. In some embodiments, the signal generator 204 may include a memory device 212, such as RAM, ROM, or another type of memory, to store the complementary sequences a and b. In other embodiments, the signal generator 204 may include a and b sequence generators. In one embodiments, the signal generator 204 includes a binary selector 210 to select one of the two complementary sequences a and b for preamble signal generation. The two complementary sequences a and b have correlation properties suitable for detection at a receiving device. For example, the complementary spreading sequences a and b may be selected so that the sum of corresponding out-of-phase aperiodic autocorrelation coefficients of the sequences a and b is zero. In some embodiments, the complementary sequences a and b have a zero or almost-zero periodic cross-correlation. In another aspect, the sequences a and b may have aperiodic cross-correlation with a narrow main lobe and low-level side lobes, or aperiodic auto-correlation with a narrow main lobe and low-level side lobes. In some of these embodiments, the sequences a and b are complementary Golay sequences. Although various lengths of the sequences a and b may be utilized, each of the sequences a and b, in some of the embodiments, has a length of 128-chips.

As is known, complementary Golay sequences may be effectively defined by a weight vector W and a delay vector D that, when applied to a suitable generator, produce a pair of complementary sequences. In one embodiment, the weight and delay vectors associated with the sequences a and b are given by $$W=[1\ 1\ -1\ 1\ -1\ 1\ -1]\ \text{and} \quad (1)$$

$$D=[1\ 2\ 4\ 8\ 16\ 32\ 64]. \quad (2)$$

The vectors W and D produce the pair of 128-chip Golay sequences $$a=1D12E2121D121DEDE2ED1DED1D121DED; \quad (3)$$

$$b=1D12E2121D121DED1D12E212E2EDE212, \quad (4)$$

expressed herein in the hexadecimal notation.

In another embodiment, the delay vector D is given by $$D=[64\ 16\ 32\ 1\ 8\ 2\ 4]. \quad (5)$$

Using D with the vectors W given by (1) produces a pair of 128-chip Golay sequences $$a=0C950C95A63F59C00C95F36AA63FA63F; \quad (6)$$

$$b=039A039AA93056CF039AFC65A930A930. \quad (7)$$

In yet another embodiment, the vector W given by (1) is used with the delay vector $$D=[64\ 32\ 16\ 8\ 4\ 2\ 1] \quad (8)$$

to generate $$a=4847B747484748B84847B747B7B8B747; \quad (9)$$

$$b=1D12E2121D121DED1D12E212E2EDE212. \quad (10)$$

With continued reference to FIG. 5, the cover code generator 206 may include a memory device 220, such as RAM, ROM, or another type of memory, to store sets of cover codes. Similarly, the cover code generator 206 may include a memory device 222, such as RAM, ROM, or another type of memory, to store u/v sequences. The cover code generator 206 also may include one or more other memory devices to store other sequences that span all or parts of the STF field, all or parts of LTF field, or both the STF field and the LTF field. In response to commands from the STF formatter 200 and the LTF formatter 202, the cover code generator 206 may generate cover codes for a particular PHY preamble.

From the foregoing, it will be appreciated that the PHY preamble controller 74 may control the signal generator 204 to generate a PHY preamble using only one pair of sequences a and b. In general, however, in addition to the sequences a and b, the PHY preamble controller 74 may also control the signal generator 204 to utilize other sequences x and y to generate certain parts of the same PHY preamble. Further, the signal generator 204 may include a cyclic shifter 230 to generate sequences a' and b' by cyclically shifting the sequences a and b in response to certain commands from the formatters 200 and 202.

Figure 6:
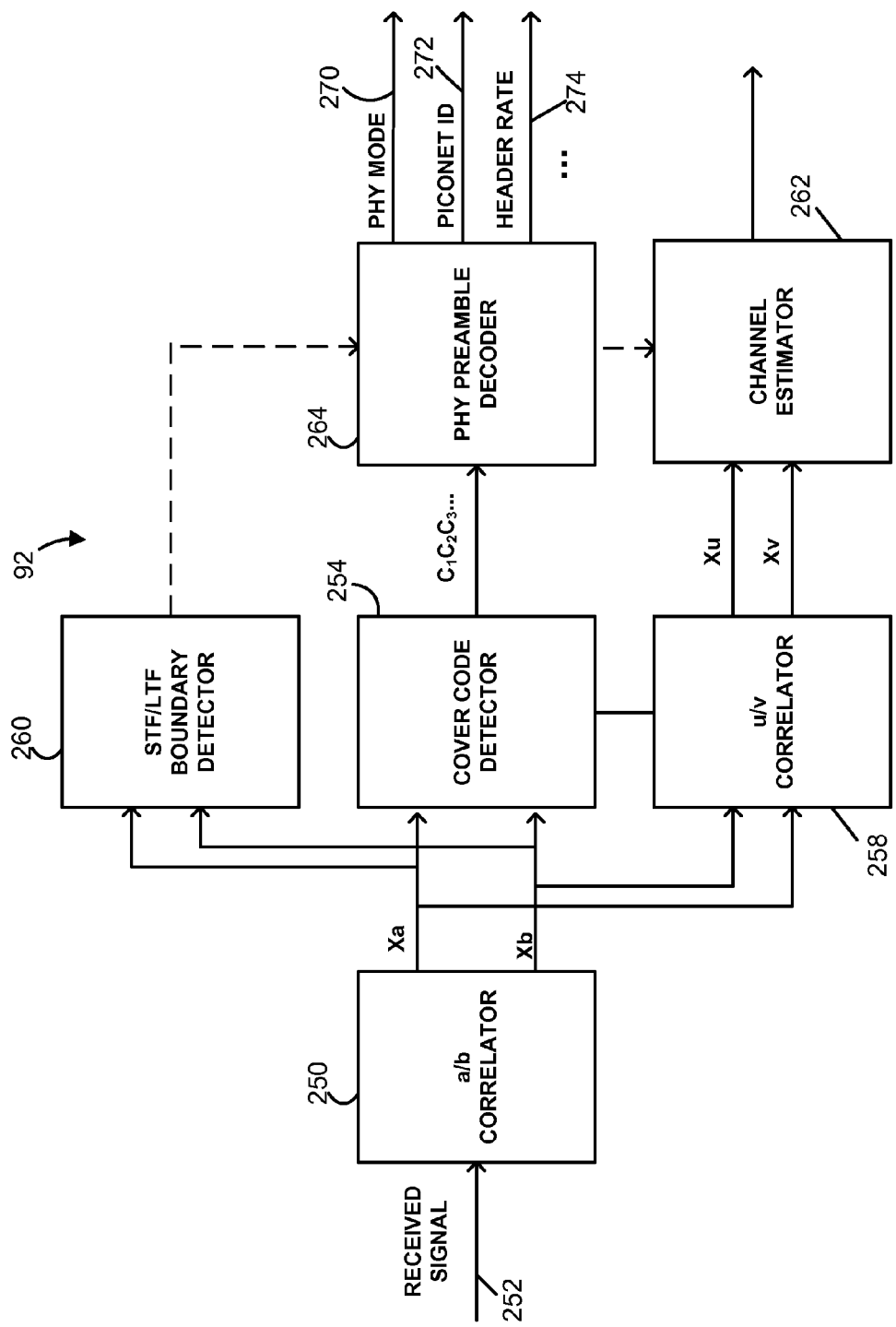
FIG. 6 is a block diagram of an example PHY preamble processor that processes the efficient PHY preamble generated by the PHY preamble controller illustrated in FIG. 5.

Now referring to FIG. 6, the PHY preamble processor 92 may include an a/b correlator 250 having an input 252 and two outputs Xa and Xb coupled to a cover code detector 254; a u/v correlator 258; an STF/LTF boundary detector 260; a channel estimator 262; and a PHY preamble decoder 264. In some embodiments, the channel estimator 262 may be a component separate from the PHY preamble processor 92. The PHY preamble decoder 264 may provide several output signals including, for example, a PHY mode identifier 270, a piconet identifier 272, and a header rate identifier 274.

In general, as a correlator (such as the a/b correlator 250) correlates the received signal with a sequence s, a peak will occur when the sequence s and a corresponding sequence in the preamble field overlap. When no signal s is present or when the signal-to-noise level is poor, no peak or only small peaks may occur. One technique for measuring peaks in a correlation signal is to generate a peak-to-average measure of the correlation signal. Referring specifically to the a/b correlator 250, the signal received via the input 252 may be cross-correlated with the sequence a, cross-correlated with the sequence b, or auto-correlated with itself. If desired, the a/b correlator 250 may perform two or all three of these operations. The a/b correlator 250 may output the correlated signals for use by other components of the PHY preamble processor 92. Optionally, the a/b correlator 250 may include detection logic to determine when the sequence a has been detected and when the sequence b has been detected in the received signal. The a/b correlator 250 may output indications of detections of the sequence a and the sequence b. Thus, the output Xa and Xb may be correlation signals, or a and b detection signals.

Next, the cover code detector 254 may determine cover codes associated with detected a and b sequences. The cover code detector 254 may supply detected cover codes and, optionally, detected a and b sequences to the PHY preamble decoder 264 for further processing. For example, if a signal corresponding to [+a, −b, −a, +b] is received, the cover code detector 254 could send to the PHY preamble decoder 264 an indication of the cover code [+1, −1, −1, +1] or, optionally, and indication of the sequence [+a, −b, −a, +b].

The STF/LTF boundary detector 260 may monitor the output of the a/b correlator 250 to detect patterns indicative of boundaries between PHY preamble fields. For example, the STF/LTF boundary detector 260 may detect the transition from the repeating sequences a, a, . . . a to b to generate a signal indicative of a boundary between the STF and the LTF fields. It will be noted that the STF/LTF boundary detector 260 may similarly detect a transition from a to −b, from b to a, a' to b', etc. More generally, a detector such as the STF/LTF boundary detector 260, may detect a change from a first sequence (e.g., a) to a second sequence (e.g., b) that is the complementary sequence to the first sequence. It will be also noted that the STF/LTF boundary detector 260 may detect multiple transitions in a preamble and accordingly generate multiple signals, possibly indicative of different transitions in the preamble. To take one example, the STF/LTF boundary detector 260 may generate a first signal in response to the transition from a to b, and a second signal in response to the transition from b to a. The PHY preamble processor 92 in some embodiments may interpret the first transition as a transition from SYNC to SFD, and the second transition as a transition from SFD to CES.

With continued reference to FIG. 6, the u/v correlator 258 may detect symbol patterns defining CES symbols (e.g., u and v or u' and v') which may have lengths that are 2, 4, 8, etc. times greater than individual a and b sequences. The symbols u and v (or u' and v') may be comprised of 2, 4, 8, etc. individual a and b sequences augmented by cover codes. To this end, the u/v correlator may 258 may, in some embodiments, receive cover code information from the cover code generator 254. In some embodiments, the functionality of the u/v correlator may 258 may be distributed among the PHY preamble decoder 264, the cover code detector 254, etc. Upon detecting symbol patterns u and v, the u/v correlator may 258 may supply signals that indicate occurrences of u and v in the received signal to the channel estimator 262 for further processing. Optionally, the u/v correlator may 258 also may supply signals that indicate occurrences of u and v in the received signal to the PHY preamble decoder 264.

Based on the output from the cover code detector 254, STF/LTF boundary detector 260, and possibly other components (e.g., the a/b correlator 250), the PHY preamble decoder 264 may determine various operational parameters communicated in the PHY preamble. In particular, the PHY preamble decoder 264 may determine whether the PHY preamble specifies SC or OFDM mode, regular or low SC, determine a header rate, determine a piconet ID, etc.

Figure 7:
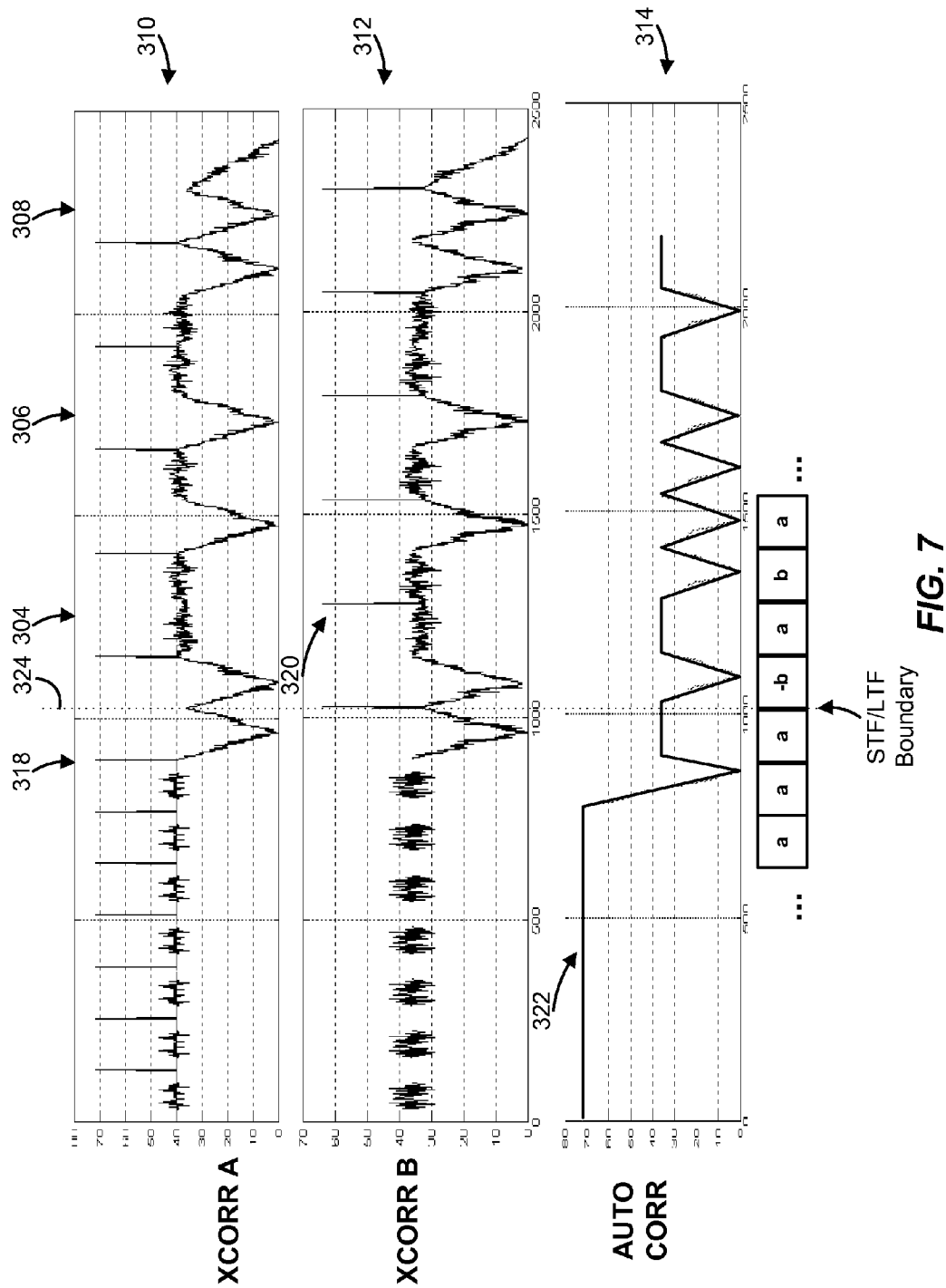
FIG. 7 depicts several example correlation diagrams of a received signal and a pair of complementary Golay sequences.

By way of illustration, FIG. 7 depicts examples of cross-correlation and autocorrelation outputs that the a/b correlator 250 may generate in response to an example signal received via the input 252. In particular, the graph 310 corresponds to the cross-correlation with a (XCORR A), the graph 312 corresponds to the cross-correlation with b (XCORR B), and the graph 314 corresponds to the autocorrelation (AUTO-CORR). A plurality of peaks 318 in the graph 310 correspond to the locations of the sequence a in the received signal. Similarly, plurality of peaks 320 in the graph 320 correspond to the locations of the sequence b in the received signal. A vertical line 324 generally corresponds to the STF/LTF boundary. To the left of the STF/LTF boundary, which corresponds to the time before the STF/LTF boundary has occurred, there are a plurality of peaks in XCORR A that occur at intervals corresponding to the length of a, and no peaks in XCORR B. Then, generally at the STF/LTF boundary, no peak occurs in XCORR A, but a peak occurs in XCORR B. This pattern could be used, for example, to detect the STF/LTF boundary. Alternatively, the STF/LTF boundary may be detected using the graph 314 by detecting, for example, the falling edge of the autocorrelation "plateau" 322.

Thus, by analyzing patterns in one or more of XCORR A, XCORR B, and AUTO-CORR, the STF/LTF boundary detector 260 may detect transitions between a and b sequences. Similarly, other components of the PHY preamble processor 92 may use the one or multiple correlation outputs from the a/b correlator 250 to further process the received signal, e.g., to determine cover codes, to take one example.

Figure 8:
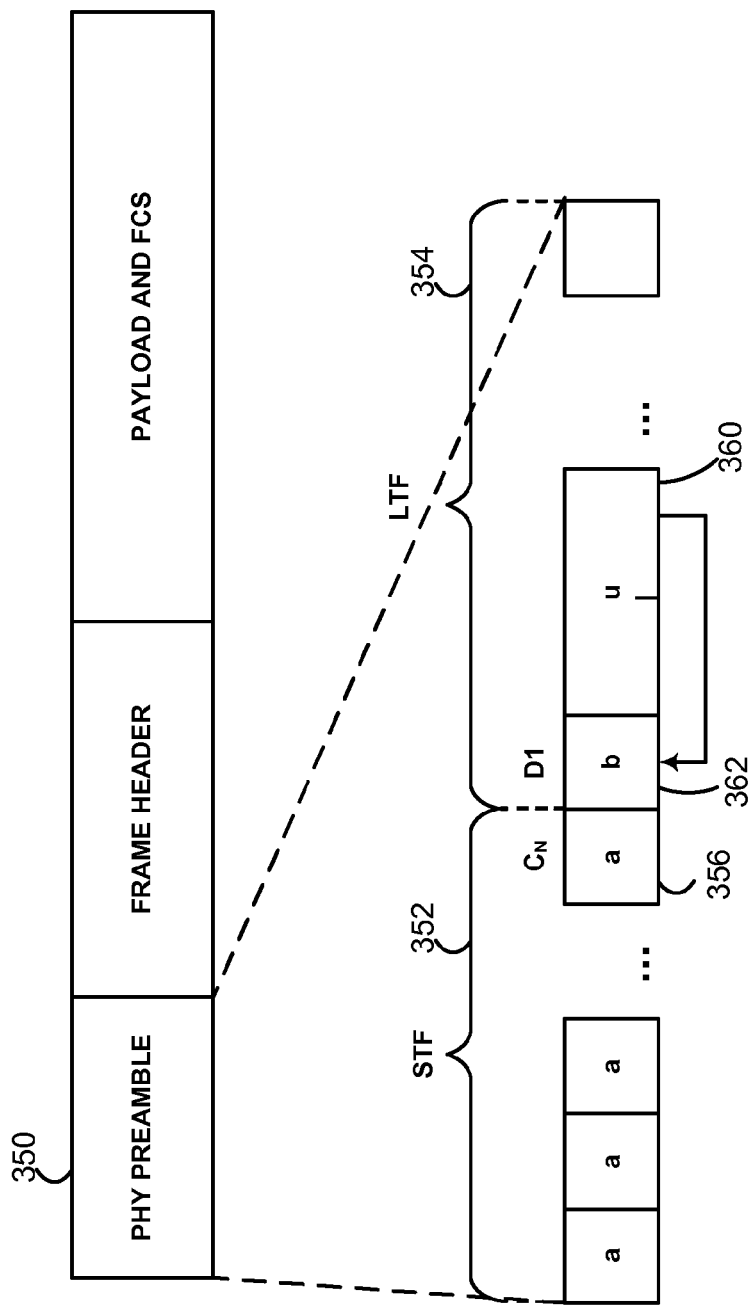
FIG. 8 is a block diagram of a general structure of an example efficient PHY preamble including a short training field (STF) and a long training field (LTF)

Various example PHY preamble formats will now be described. Such preambles may be generated by the system of FIG. 5, for example. Similarly, such preambles may be processed by the system of FIG. 6, for example. FIG. 8 is a diagram of one example of a PHY preamble format 350. In general, the PHY preamble 350 may precede a frame header and a payload similar to the frame header 160 and the payload 162 discussed above with reference to FIG. 4, or may be used with any other desired format of a data unit. The PHY preamble 350 includes an STF field 352 and an LTF field 354. The STF field 352 may include several repetitions of the same sequence a, including the last instance 356. In some embodiments, the STF field 352 may perform the function of the SYNC field 124 (see FIG. 3) and/or the SYNC field 154 (see FIG. 4) of the prior art PHY preambles, i.e., the receiving device 14 may use the repeating sequences in the STF field 352 to detect the beginning of transmission, synchronize the clock, etc.

Similarly, the LTF field 354 may perform the function of the CES fields 128 or 158 (see FIGS. 3 and 4) of the prior art PHY preamble in at least some of the embodiments of the efficient PHY preamble format 350. For example, the LTF field 354 may include a pair (or a longer sequence) of complementary CES symbols (u, v) and, in some embodiments, corresponding cyclic prefixes and/or cyclic postfixes. As indicated above, a CES symbol may be comprised of multiple individual a and b sequences augmented by cover codes. In some cases, a CES symbol may have a corresponding complementary sequence. For example, if sequences a and b are complementary Golay sequences, then [a b] and [a −b] are also complementary Golay sequences, and [b, a] and [b −a] are complementary Golay sequences. It is also possible to form longer sequences by recursively applying this rule to the pairs [a b] and [a −b], [b, a] and [b −a], etc. As used herein, the term "complementary CES symbols" refers to a pair of CES symbols that are complementary sequences such as, for example, complementary Golay sequences.

Generally with respect to Golay sequences, it is also noted that if a and b define a pair of complementary Golay sequences, then a and −b also define a pair of complementary Golay sequences. Further, an equal cyclic shift of complementary Golay sequences a and b produces a pair of complementary Golay sequences a' and b'. Still further, a pair of complementary Golay sequences a" and b" may be generated by shifting each of the sequences a and b by a non-equal number of positions.

In the example illustrated in FIG. 8, a CES symbol 360 (u) is preceded by a cyclic prefix 362, which is a copy of the last portion of the CES symbol u. For the purposes of clarity, FIG. 8 and other diagrams of the present disclosure depict prefix and postfix relationships with arrows directed from a portion of a CES symbol toward the corresponding copy outside the CES symbol. To consider one particular example, the CES symbol 360 may be a 512-chip long Golay sequence, and the cyclic prefix 362 may be a copy of the last 128 chips of the CES symbol 360. In general, the CES symbol 360 may be followed by a cyclic postfix of the CES symbol 360, by another CES symbol, by a cyclic prefix of another CES symbol, etc. Further, it will be noted that the LTF field 354 may include multiple repetitions of CES symbol patterns. At least some of these embodiments are discussed in more detail below.

As explained previously, the CES symbol u is comprised of complementary sequences a (also used in the STF field 352) and b, augmented by cover codes. Thus, the last portion 356 of the STF 352 is a complementary sequence corresponding to the first portion of the LTF 354, which in the embodiment of FIG. 8 is the cyclic prefix of the CES symbol 354. In at least some embodiments, the sequences a and b are complementary Golay sequences. It will be noted that the boundary between the STF field 352 and the LTF field 354 corresponds to the end of the last portion 356 of the STF 352 and the beginning of the cyclic prefix 362. The a/b correlator 250 and the STF/LTF boundary detector 260 may thus determine the end of the STF field 352 and the beginning of the LTF field 354 by cross-correlating the received signal with one or both sequences a and b, and/or generating an auto-correlation of the received signal.

Figure 9:
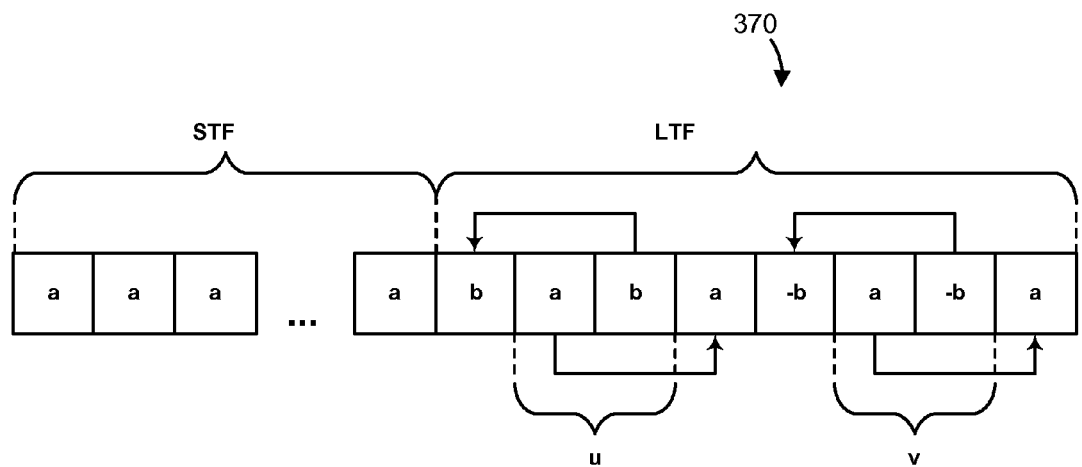
FIG. 9 is a block diagram of an efficient PHY preamble in which a pair of complementary spreading sequences signal the boundary between two training fields.

FIG. 9 is a diagram of one particular example of a PHY preamble consistent with the efficient format discussed above with reference to FIG. 8. For the purposes of conciseness, the STF and LTF fields shall be referred to hereinafter simply as "STF" and "LTF." The PHY preamble 370 includes a series of sequences a transmitted repeatedly with the same polarity (+1) until the end of STF, and LTF with at least one cycle that includes a pair of complementary CES symbols u and v, each twice as long as the sequence a, and the corresponding cyclic prefixes and postfixes of u and v. Of course, LTF may include any suitable number of cycles. For the purposes of simplicity, however, LTF in FIG. 8 and in the subsequent diagrams shall be illustrated with only one cycle. It will be noted that the cyclic prefix +b of the CES symbol u is associated with a spreading sequence b complementary to the spreading sequence a used with the last portion of STF. Accordingly, the cyclic prefix +b may serve both to reduce or eliminate ISI, and to delimit the boundary between STF and LTF. The PHY preamble 370 thus efficiently eliminates the SFD field (see FIGS. 3 and 4), and is thus shorter than the prior art preambles of FIGS. 3 and 4. Moreover, the PHY preamble 370 may be used as a common preamble for both SC and OFDM modes of communication.

Figure 10:
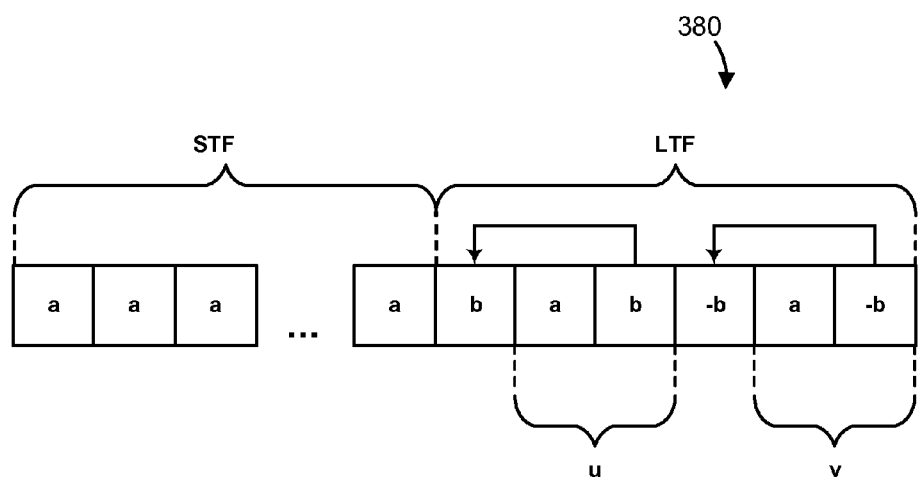
FIG. 10 is a block diagram of an efficient PHY preamble that omits cyclic postfixes in the long training field.

FIG. 10 is a diagram another example of a PHY preamble consistent with the efficient format discussed above with reference to FIG. 8. The LTF of a PHY preamble 380 includes CES symbols u and v identical to the symbols u and v of FIG. 9. However, LTF in the PHY preamble 380 omits the cyclic postfixes of the CES symbols u and v. The format illustrated in FIG. 10 may be particularly useful for frequency-domain channel estimation. The PHY preamble 380 may be also used for SC communications, although the receiver may experience some ISI in the estimated channels due to the absence of postfixes. As in the format of FIG. 9, the receiver may detect the STF/LTF boundary based on the difference in correlation output between the last symbol of STF and the first symbol of LTF.

Figure 11:
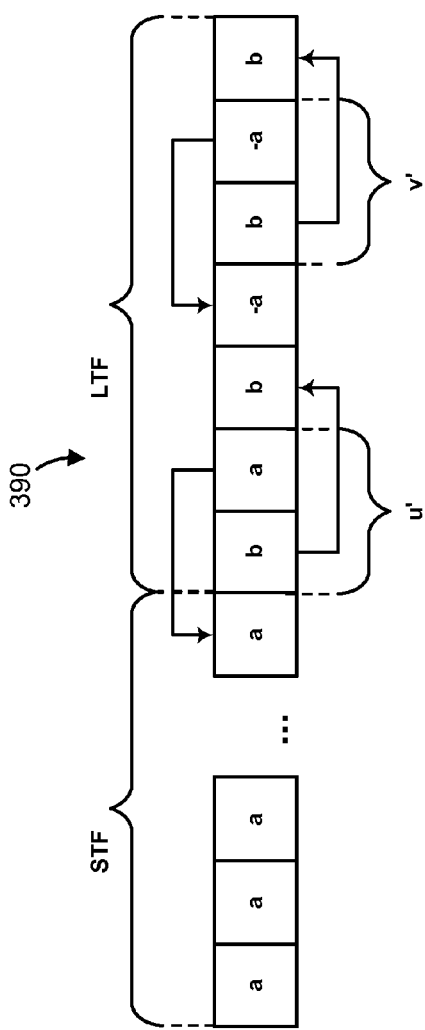
FIG. 11 is a block diagram of an efficient PHY preamble in which the last period of the short training field corresponds to the cyclic prefix of the first CES symbol in the long training field.

FIG. 11 is a diagram of example of a PHY preamble. LTF of a PHY preamble 390 includes at least one cycle during which complementary CES symbols u'=[b a] and v'=[b −a] are transmitted. The CES symbol u' is transmitted immediately following the last period of STF (i.e., there is no cyclic prefix to u'). However, because the sequence a transmitted in the last period of STF is identical to the last portion of the CES symbol u', the last sequence of STF advantageously serves as the cyclic prefix of the u' (as well as the complement of the first portion b of the CES symbol u'). In this manner, the format illustrated in FIG. 11 further reduces the length of the PHY preamble as compared to the example format of FIG. 9.

Figure 12:
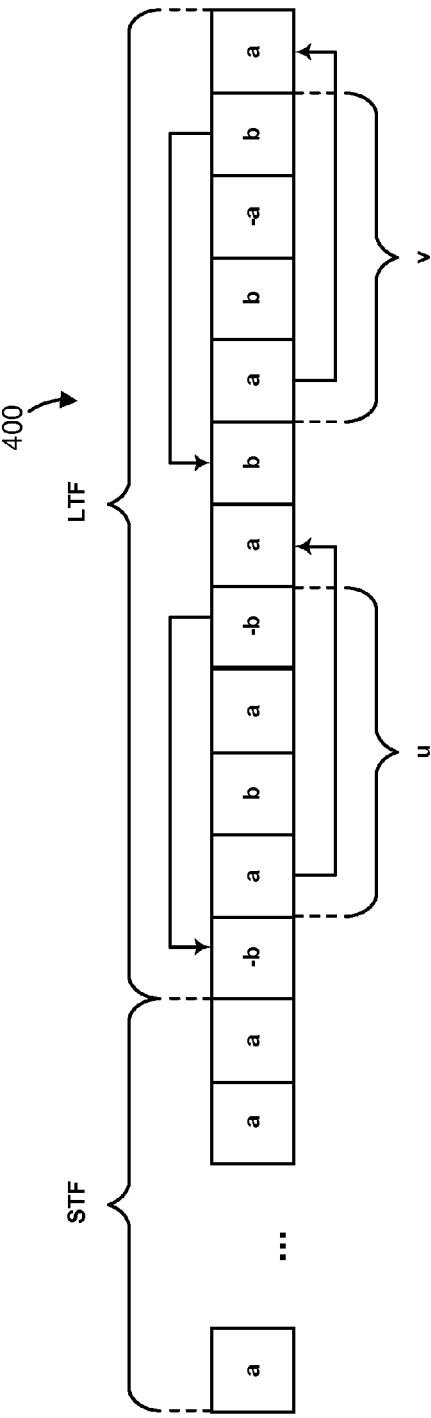
FIG. 12 is a block diagram of an efficient PHY preamble with four-period CES symbols, in which a pair of complementary spreading sequences signal the boundary between two training fields.

FIG. 12 is a diagram of another example of a PHY preamble 400 that includes a series of sequences a transmitted repeatedly until the end of STF, and LTF with a pair of complementary CES symbols u=[a b a −b] and v=[a b −a b] and the corresponding cyclic prefixes and postfixes. In general, the length of u and v symbols can be expressed as $$\text{Length}(u)=\text{Length}(v)=n\text{Length}(a)=n\text{Length}(a), \quad (11)$$

where n is a positive integer equal to or greater than two. Preferably, n is a multiple of two. In the example of FIG. 12, n is four. In this example, the PHY preamble 410 corresponds to a structure largely similar to the PHY preamble 370 (see FIG. 9), in that the cyclic prefix −b of the CES symbol u is associated with a spreading sequence b that is complementary to the spreading sequence a, which is used as the last period of the field STF.

Figure 13:
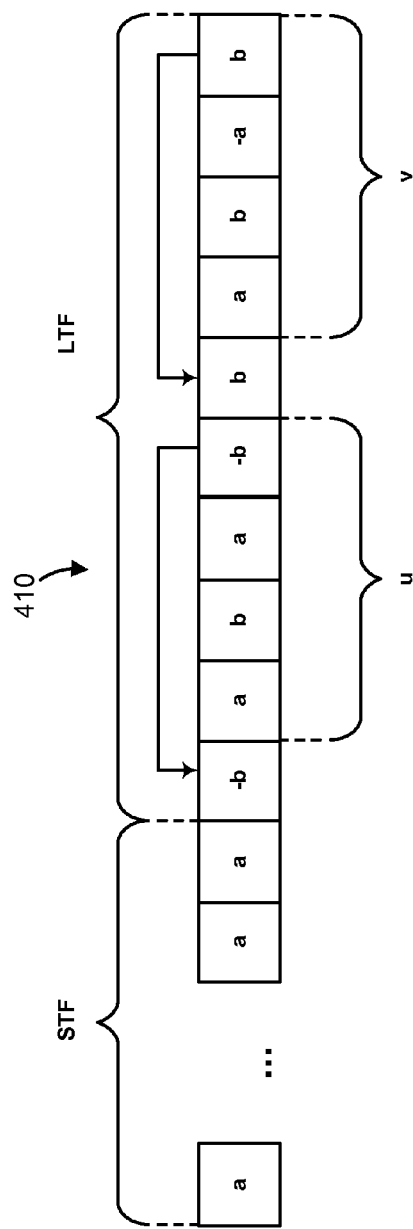
FIG. 13 is a block diagram of an efficient PHY preamble with four-period CES symbols that omits cyclic postfixes in the long training field.

FIG. 13 is a diagram of another example of a PHY preamble 410. The LTF of the PHY preamble 410 includes CES symbols u and v identical to the symbols u and v of FIG. 12. However, LTF in the PHY preamble 410 omits the cyclic postfixes of the CES symbols u and v. The format illustrated in FIG. 13 may be used in frequency-domain channel estimation in OFDM or SC, for example, although the receiver may experience some ISI in the estimated channels in the SC mode. As in the format of FIG. 12, the receiver may detect the STF/LTF boundary based on the difference in correlation output between the last symbol of STF and the first symbol of LTF.

Figure 14:
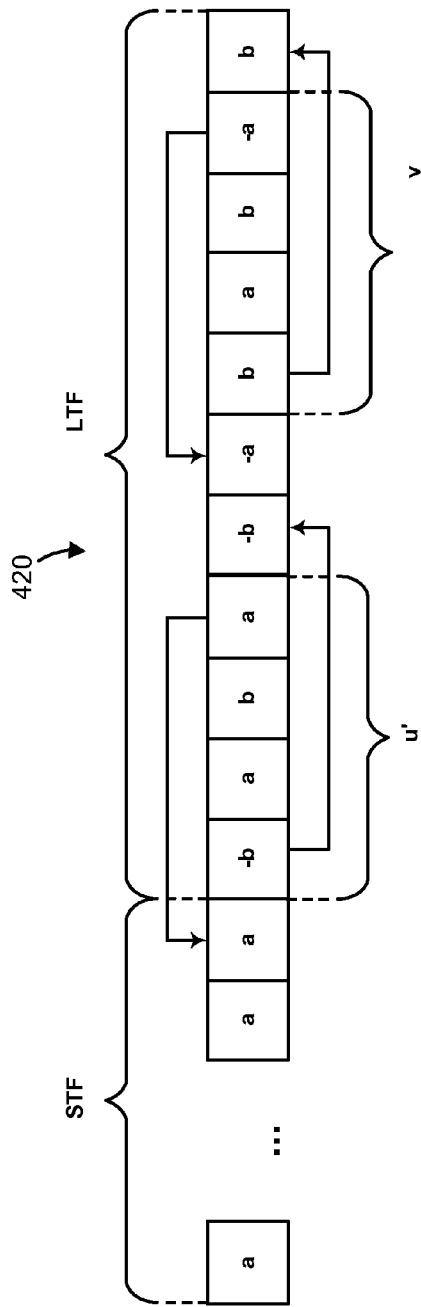
FIG. 14 is a block diagram of an efficient PHY preamble with four-period CES symbols in which the last period of the short training field corresponds to the cyclic prefix of the first CES symbol in the long training field.

FIG. 14 is a diagram of another example of a PHY preamble 420. The CES symbol u' of the PHY preamble 420 is transmitted immediately following the last period of STF. However, because the sequence a transmitted in the last period of STF is identical to the last portion of the CES symbol u', the last sequence of STF advantageously serves as the cyclic prefix of u' (as well as the complement of the first portion −b of the CES symbol u'). In this manner, the format illustrated in FIG. 14 further reduces the length of the PHY preamble as compared to the example preamble format 400 of FIG. 12.

From the discussion of FIGS. 9-14, it will be appreciated that a common PHY preamble may be defined for use in SC and OFDM modes of communication; that the STF/LTF boundary may be signaled using complementary spreading sequences such as Golay sequences, for example; that postfixes sometimes may be omitted at a relatively small cost to the quality of channel estimation; and that the PHY may be further shortened by selecting the first CES symbol so that the last sequence of the CES symbol are identical to the sequence transmitted in the last period of STF. It will be also noted that in general, CES symbols of any desired length may be used.

FIG. 15 is a diagram of another example of a PHY preamble 430. In the PHY preamble 430, LTF includes two CES symbols u=[−b a b a] and v=[−b −a −b a]. The CES symbol v is immediately followed by its cyclic postfix, −b. Similar to the examples discussed above, STF includes a series of repeated sequences a. In the particular embodiment of FIG. 15, the last period of STF is equal to the last period of the first CES symbol u. The first symbol of the CES symbol u is −b, which is complimentary to the spreading sequence a in the last period of the STF. Thus, the last period of STF serves both as a delimiter between STF and LTF and as a cyclic prefix of the CES symbol u. Moreover, the last period of the CES symbol u is equal to the last period of the symbol v, thus providing the additional function of a cyclic prefix of the CES symbol v. From the foregoing, it will be appreciated that although the CES symbol v immediately follows the CES symbol u which, in turn, immediately follows STF, each of the CES symbols u and v is provided with both prefixes and postfixes. As a result, the PHY preamble 430 is a highly efficient format that may accommodate information sufficient for both SC and OFDM communication modes.

FIG. 16 is a diagram of another example of a PHY preamble 440. The PHY preamble 440 includes CES symbols u' and v'. In this example, the CES symbol u' is preceded by the cyclic prefix b transmitted at the beginning of LTF. As compared to the PHY preamble 440 of FIG. 15, each in the sequence of symbols of u' is transmitted using a sequence (e.g., a or b) complimentary to the sequence used with the respective symbol of u while applying the same cover code to the sequence (e.g., −a in u' corresponds to −b in u, b in u' corresponds to a in u, etc.). The CES symbols v and v' have the same relationship. In other words, u' and v' are constructed by "flipping" each respective spreading sequence in every period of u and v. Because STF in the preambles 430 and 440 is the same, b is transmitted at the beginning of LTF to provide an STF/LTF delimiter and a cyclic prefix for u'. As in at least some of the examples discussed above, the PHY preamble 440 may be used for both SC and OFDM modes of operation.

Figure 17:
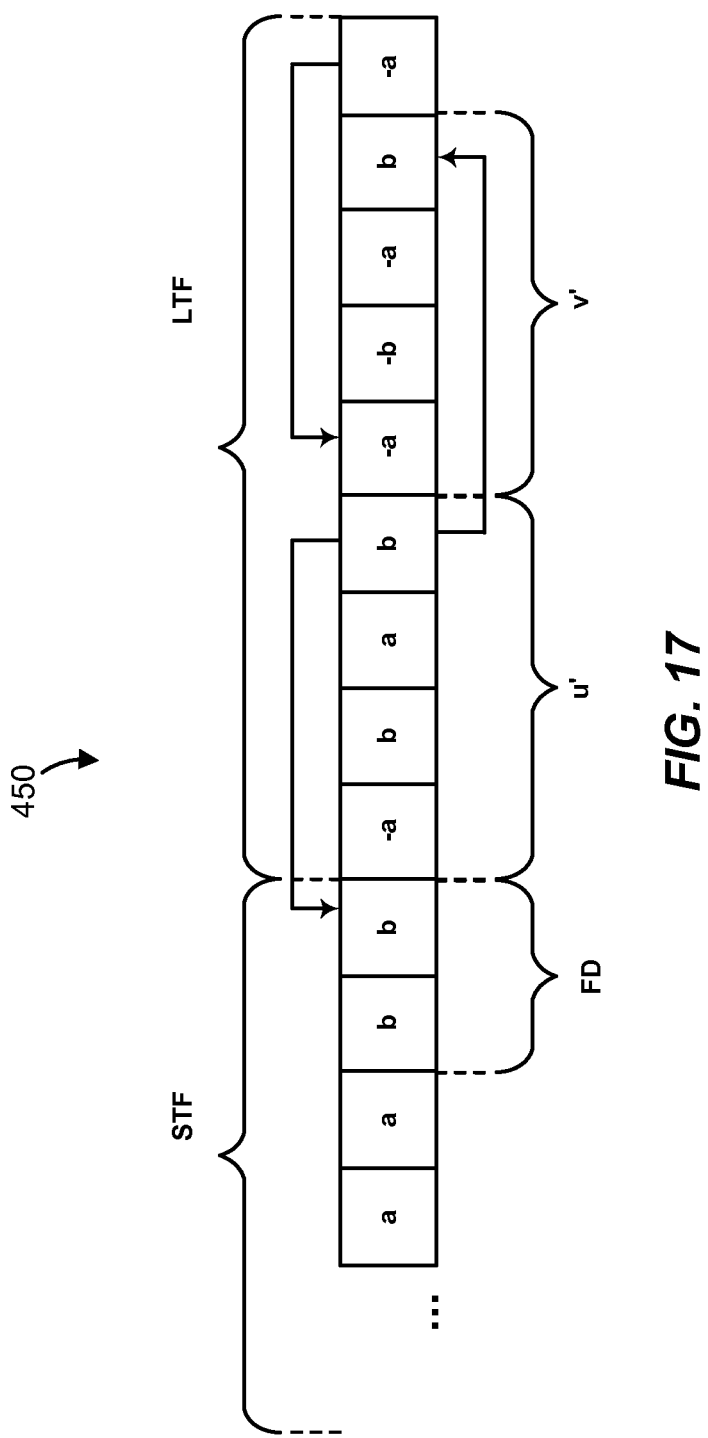
FIG. 17 is a block diagram of an efficient PHY preamble that includes a frame delimiter that includes a cyclic prefix of the first CES symbol of the long training field.

FIG. 17 is a diagram of another example of a PHY preamble 450. The STF includes a relatively short field in which the sequence b is repeatedly transmitted after a repeated transmission of a in an earlier portion of STF. In a sense, several repetitions of b (in this example, two periods) serve as an explicit frame delimiter ("FD") and, accordingly signal frame timing in a reliable manner. LTF includes CES symbols u' and v', with the last portion in u' matching the sequence and the cover code in FD. As a result, the last period of FD both signals the end of STF and provides a cyclic prefix of u'. If desired, the number of periods in FD could be increased (i.e., there could be three or more b sequences). Referring to FIG. 16, it will be also noted that the PHY preamble 440 illustrated in FIG. 16 may be considered to include FD with the length of 1. Thus, the boundary between STF and LTF in the preamble 440 could be interpreted to be the beginning of the symbol u'.

Figure 18:
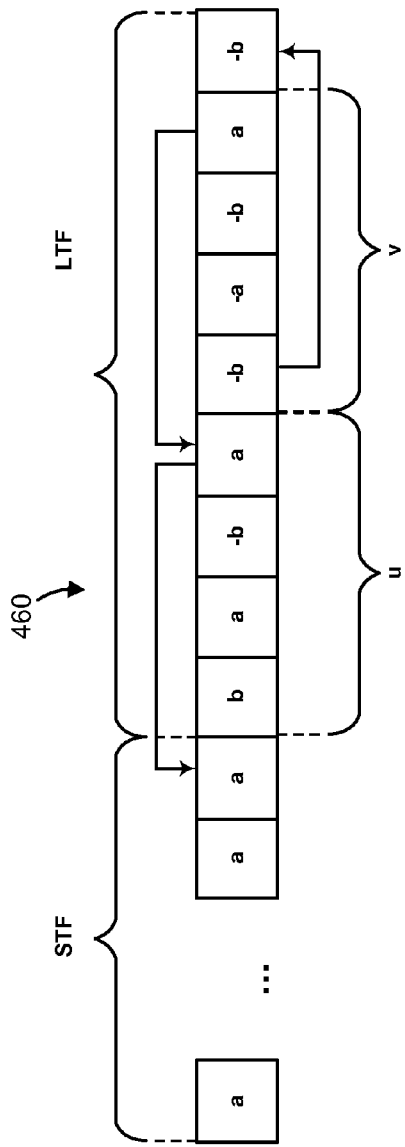
FIG. 18 is a block diagram of an efficient PHY preamble with four-period CES symbols in which the last period of the short training field corresponds to the cyclic prefix of the first CES symbol in the long training field, and the last period of the first CES symbol corresponds to the cyclic prefix of the second CES symbol.
Figure 19:
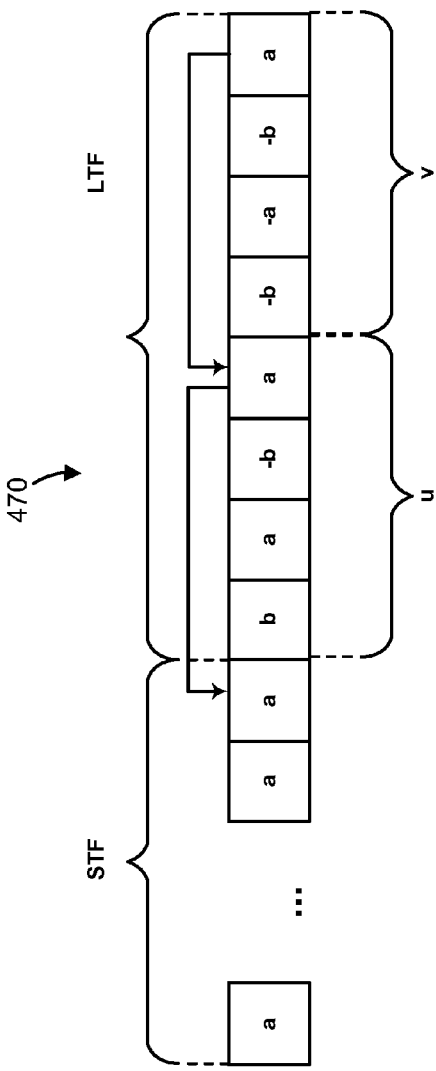
FIG. 19 is a block diagram of the efficient PHY preamble of FIG. 18 in which the cyclic postfix of the second CES symbol is omitted.

FIG. 18 is a diagram of another example of a PHY preamble 460. In the example preamble 460, CES symbols u and v are adjacent, and u is transmitted immediately at the beginning of LTF. Similar to the case discussed above with reference to FIG. 15, the last periods of STF and u provide additional functions of the respective prefixes of u and v. FIG. 19 is a diagram of another example of a PHY preamble 470. The PHY preamble 470 is similar to the format of the PHY preamble 460, except that the last period of LTF (the postfix of v) is omitted. As discussed above, this format may be used in both SC and OFDM modes at some potential cost to the quality of channel estimation.

Figure 20:
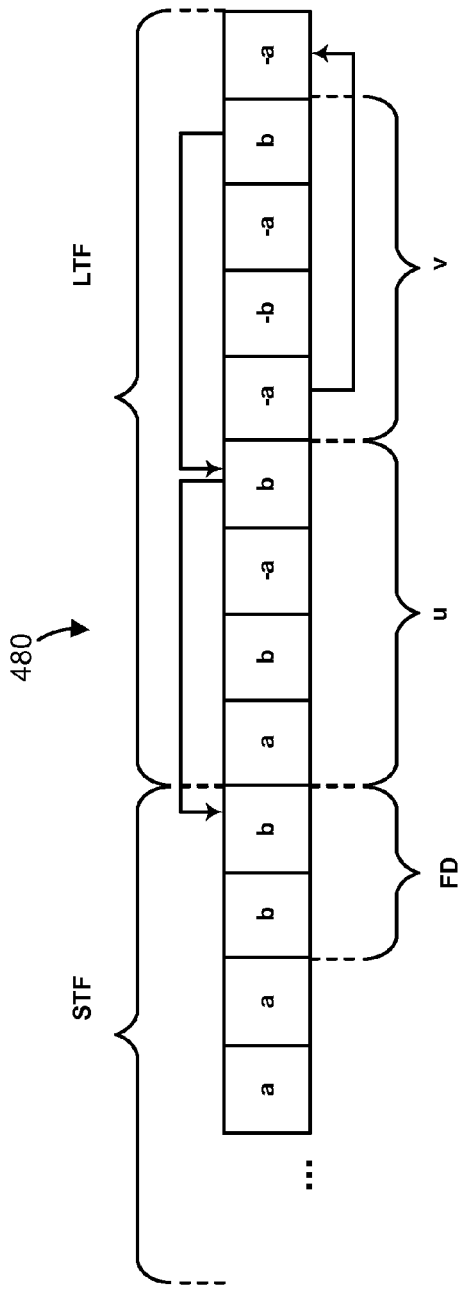
FIG. 20 is a block diagram of another example of a PHY preamble that includes a frame delimiter at the end of STF.
Figure 21:
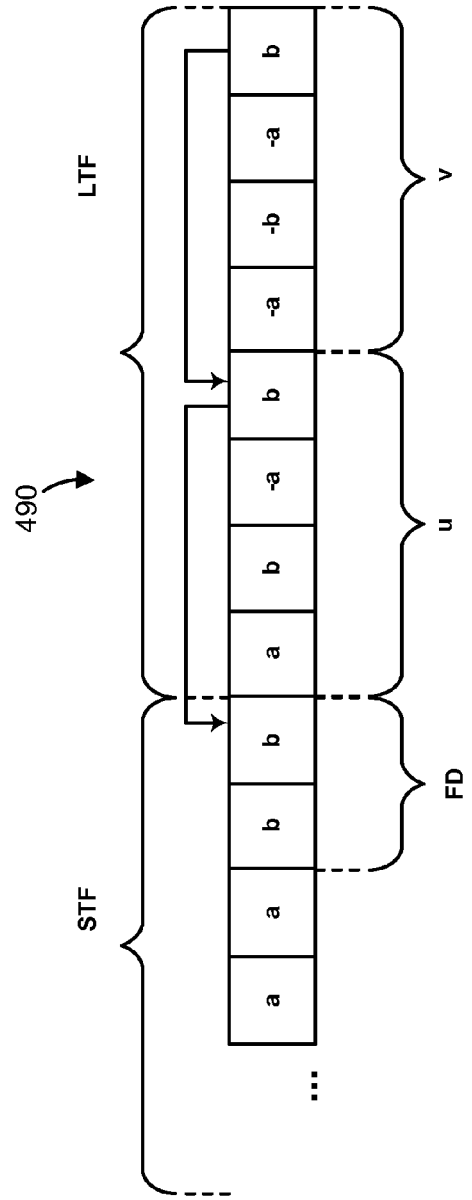
FIG. 21 is a block diagram of the efficient PHY preamble of FIG. 20 in which the cyclic postfix of the second CES symbol is omitted.

FIG. 20 is a diagram of another example of a PHY preamble 480. The PHY preamble 480 includes a FD at the end of STF. In this example, FD includes two periods during which the sequence b is transmitted. Of course, FD having other lengths also can be used (e.g., one period or three or more periods). The last sequence b of FD serves as a prefix for u, and the last b sequence of u serves as a prefix for v. FIG. 21 is a diagram of another example of a PHY preamble 490. The PHY preamble 490 omits the last period of LTF which the PHY preamble 480 uses to transmit the cyclic postfix of v. FIGS. 22 and 23 are diagrams of further example of a PHY preambles 500, 510. The preambles 500, 510 each include a cyclic prefix of the first CES symbol in the first period of LTF, and in which the cyclic prefix at the beginning of LTF is also a sequence complementary to the sequence used in the last period of STF, and therefore serves as a reliable STF/LTF delimiter. Also, the last b sequence in u serves as a prefix for v. It will also be noted that the PHY preambles 500 and 510 of respective FIGS. 22 and 23 are similar except for the omission of the cyclic postfix of v in the PHY preamble 510.

It will be noted that FIGS. 15-23 illustrate various embodiments in which four-period CES symbols u and v are efficiently used to eliminate at least some of cyclic prefixes, cyclic postfixes, and (in at least some embodiments) explicit SFD fields. Further, it is shown in FIGS. 15-23 that the second CES symbol may be transmitted immediately after the first CES symbol while still eliminating ISI (i.e., because a cyclic prefix for v is provided by u). Still further, in some embodiments, the first CES symbol may be transmitted at the immediate beginning of LTF (i.e., following STF without intervening periods), where the last sequence in STF provides a cyclic prefix for the first CES symbol.

Figure 24:
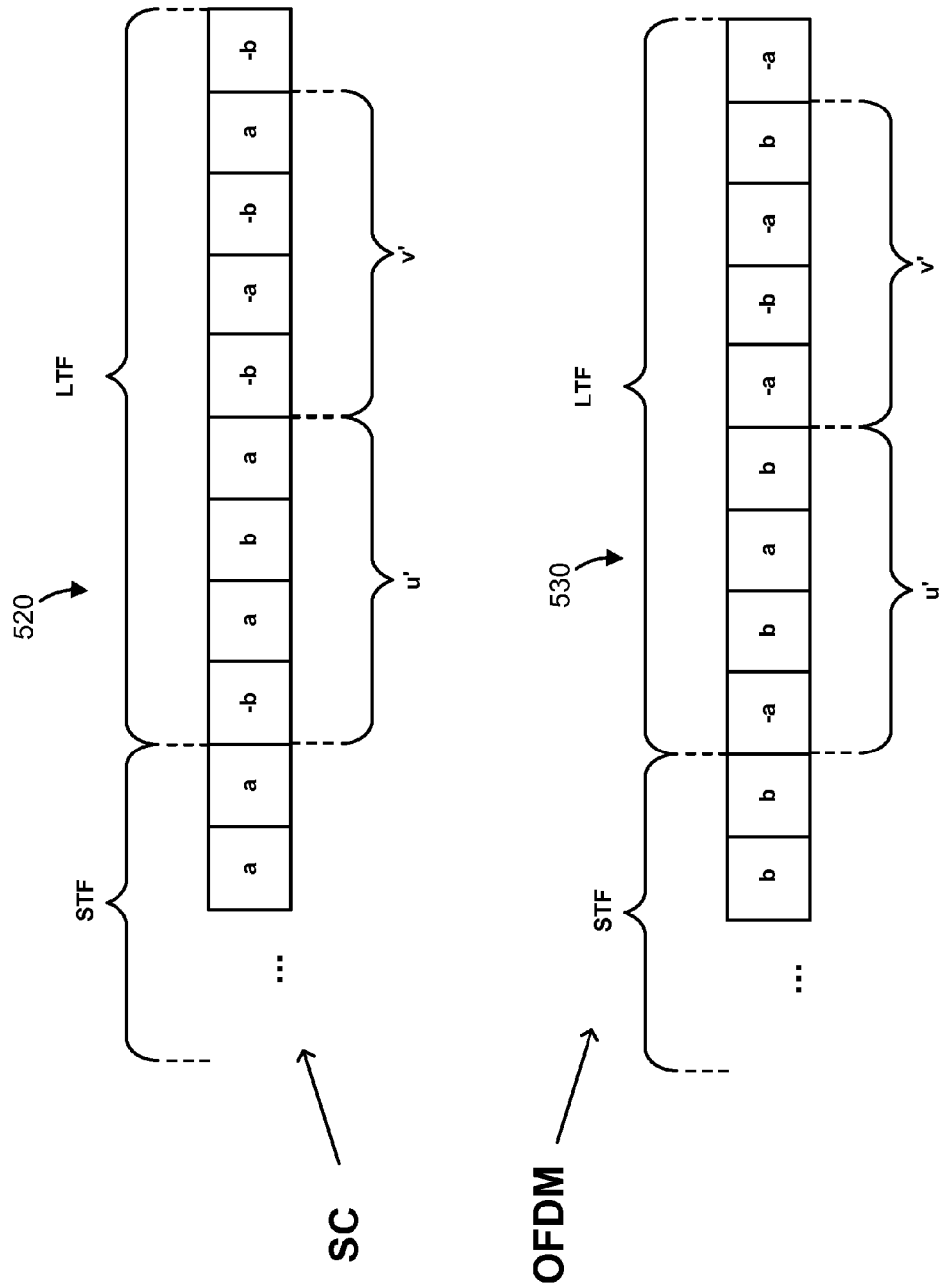
FIG. 24 is a block diagram of a PHY preamble format corresponding to the preamble of FIG. 15 in which the selection of one of two complementary sequences in the STF and LTF fields indicates the selection of a PHY communication mode (e.g., SC mode or OFDM mode)

Next, FIG. 24 illustrates a technique whereby the selection of a and b sequences in STF and LTF indicates different modes of transmission (e.g., an SC mode or an OFDM mode). PHY preambles 520 and 530 have the same format, except that sequences a and b are swapped. In particular, the PHY preamble 520 corresponds to a format similar to the one illustrated in FIG. 15, with the spreading sequence a used in STF, whereas the PHY preamble 530 has the same format as the PHY preamble 520, except that the sequences a and b are swapped. The PHY preamble 520 may be used for communications while the PHY preamble 530 may be used for OFDM communications. Of course, the opposite association between the preambles 520 and 530 and PHY modes may be used instead. In one aspect, FIG. 24 illustrates a common preamble format that can be used in both SC and OFDM communications and so that a receiving device (e.g., the receiving device 14 of FIG. 1) can determine whether the packet is transmitted via SC or OFDM by analyzing the preamble. For example, an STF with a sequences may indicate SC mode, whereas an STF with b sequences may indicate OFDM mode.

Figure 25:
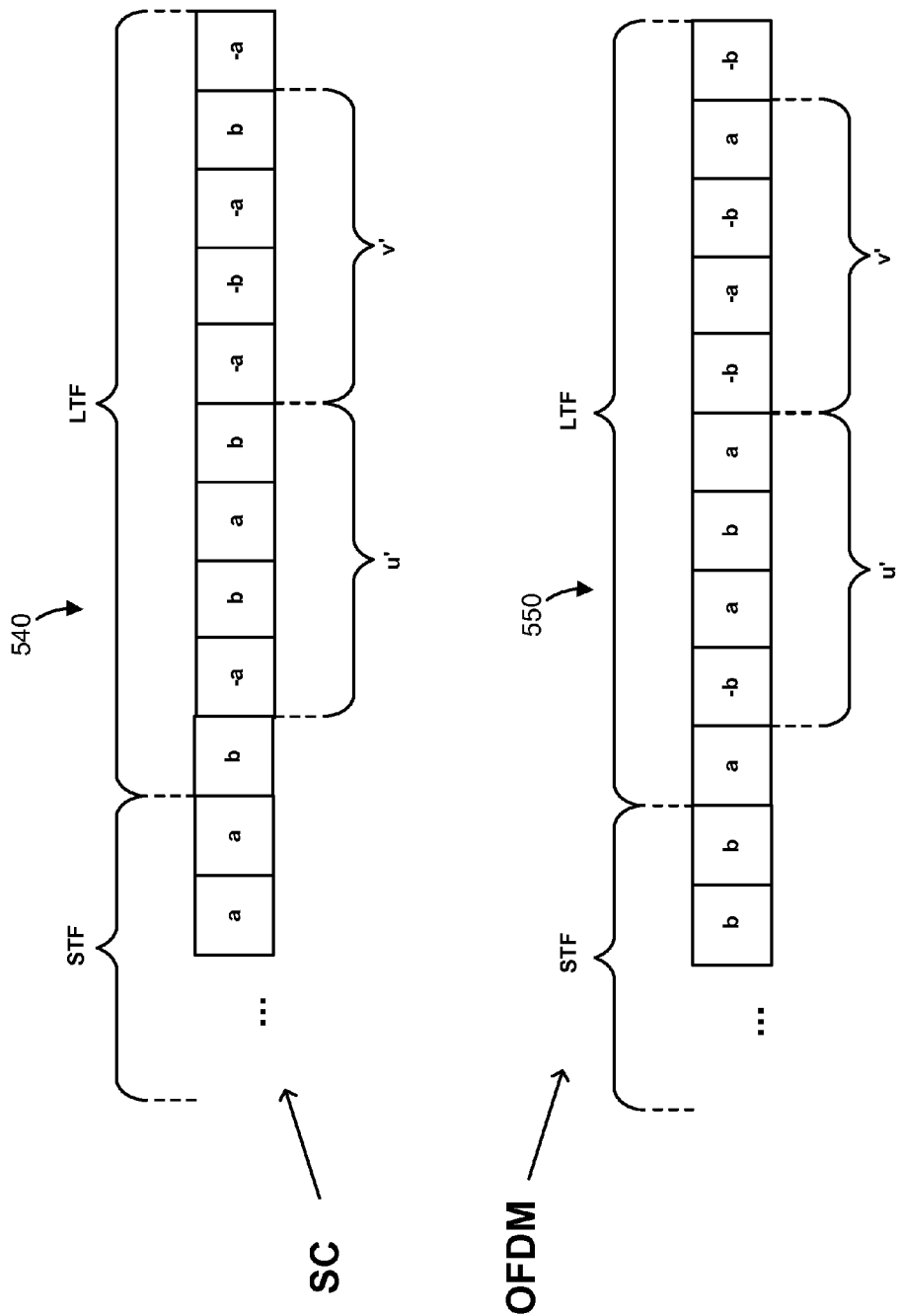
FIG. 25 is a block diagram of a PHY preamble format corresponding to the PHY preamble of FIG. 16 in which the selection of one of two complementary spreading sequences in the STF and LTF fields indicates the selection of a PHY communication mode (e.g., SC mode or OFDM mode)

FIG. 25 illustrates a technique of signaling SC/OFDM selection but relies on the PHY preamble format discussed above with reference FIG. 16. More specifically, PHY preambles 540 and 550 have an LTF that includes a cyclic prefix for u' at the beginning of LTF, u', v' immediately following u', and a cyclic postfix of v. The preambles 540 and 550 are the same except that the sequences a and b are swapped. The STF with a sequences may indicate SC mode, whereas an STF with b sequences may indicate OFDM mode. The sequence a in STF indicates the SC mode of operation, while the spreading sequence b in STF indicates OFDM mode (or vice versa). Although FIGS. 24 and 25 were discussed with respect to encoding the parameter to indicate an SC mode versus an OFDM mode, the same technique can be used to indicate other modes or parameters.

Figure 26:
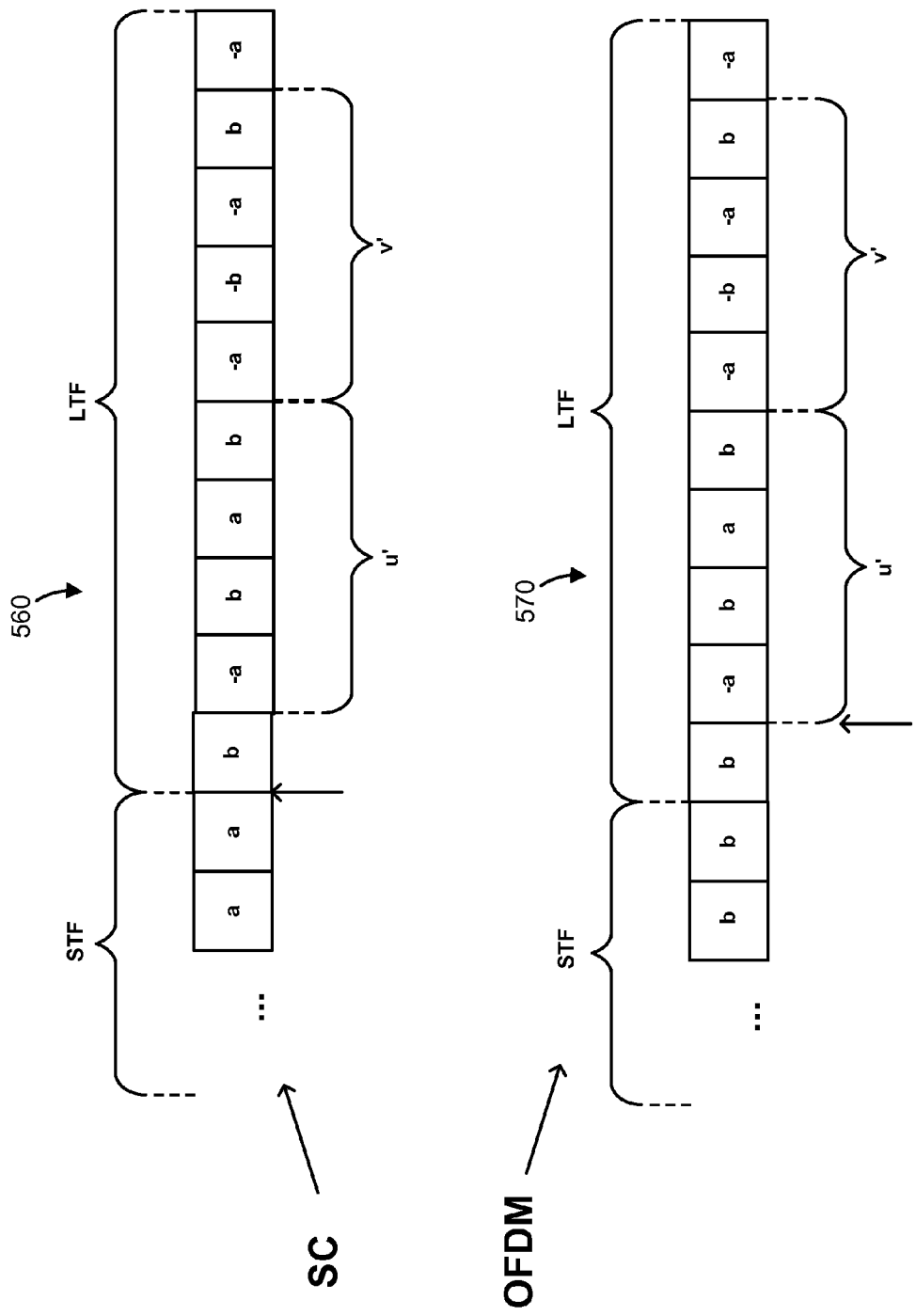
FIG. 26 is a block diagram of a PHY preamble format corresponding to the PHY preamble of FIG. 16 in which the selection of one of two complementary spreading sequences in the STF field indicates the selection of a PHY communication mode (e.g., SC mode or OFDM mode)

FIG. 26 illustrates a technique whereby the selection of a and b sequences in STF indicates different modes of transmission (e.g., an SC mode or an OFDM mode). Whereas LTF in PHY preambles 560 and 570 is essentially the same, STF in the PHY preamble 560 (which may correspond to SC) uses the sequence a and STF in the PHY preamble 570 uses b (which may correspond to OFDM). As a result, a receiving device (e.g., the receiving device 14) may detect the STF/LTF boundary in the OFDM mode only after the first period of LTF. If desired, the PHY preamble 570 may be viewed as having LTF that begins with the first period of the first CES symbol, and in which the cyclic prefix of the first CES symbol is the last period of STF. An STF with a sequences may indicate SC mode, whereas an STF with b sequences may indicate OFDM mode.

Figure 27:
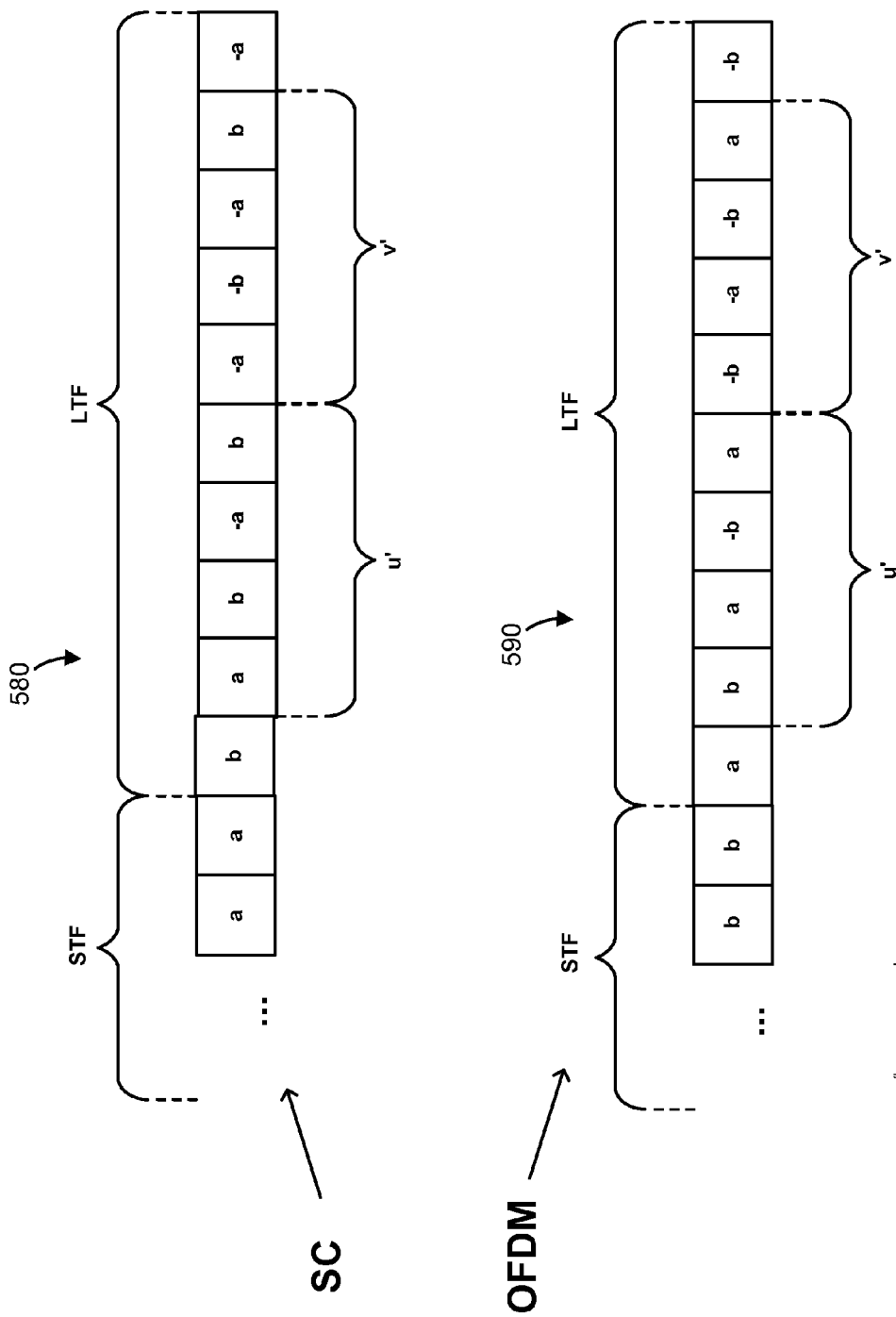
FIG. 27 is a block diagram of a PHY preamble format corresponding to the PHY preamble of FIG. 20 in which the selection of one of two complementary spreading sequences in the STF and LTF fields indicates the selection of a PHY communication mode (e.g., SC mode or OFDM mode)
Figure 28:
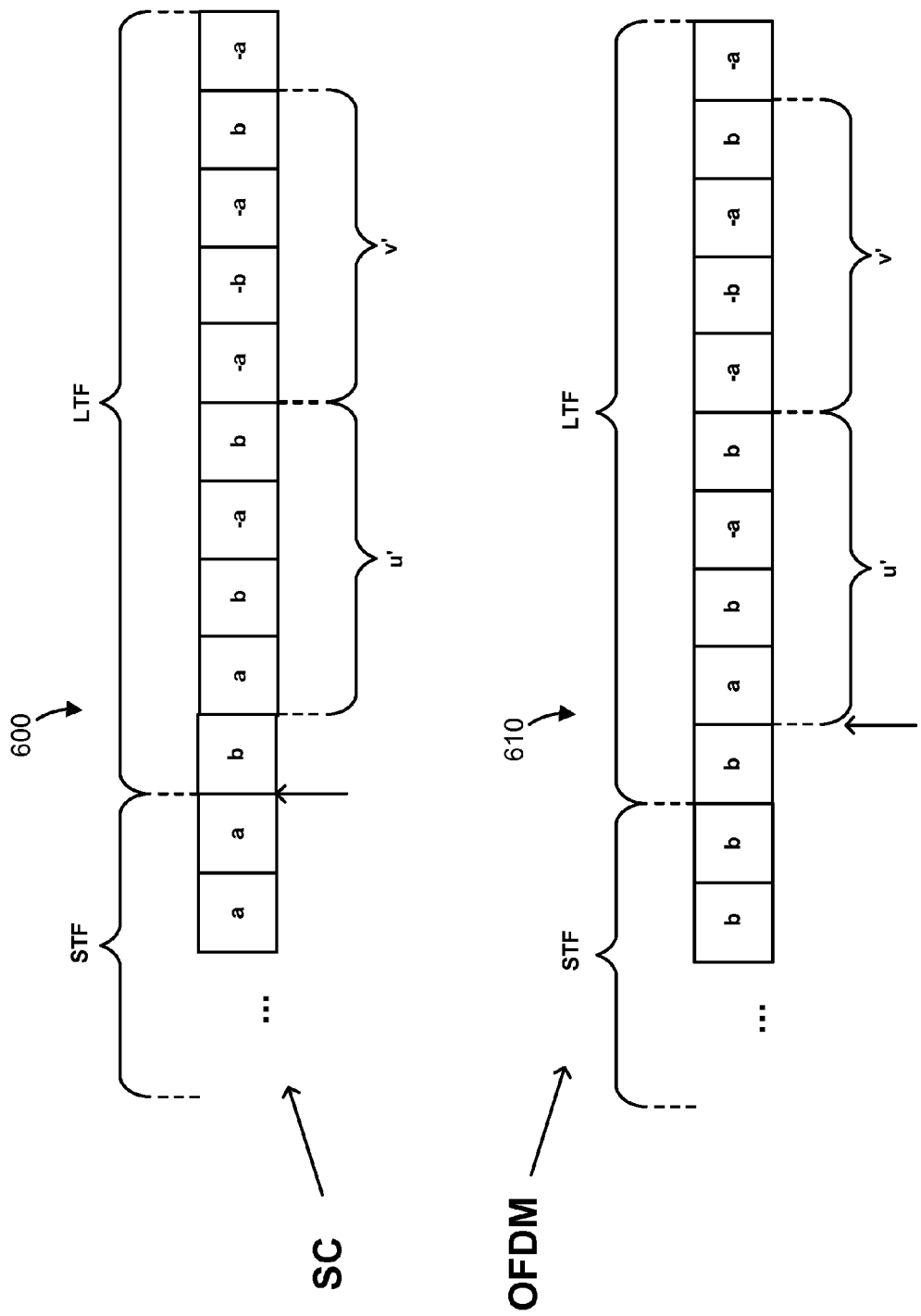
FIG. 28 is a block diagram of a PHY preamble format corresponding to the PHY preamble of FIG. 20 in which the selection of one of two complementary spreading sequences in the STF field indicates the selection of a PHY communication mode (e.g., SC mode or OFDM mode)

FIG. 27 uses the preamble format similar to the PHY preamble 480 of FIG. 20, and applies a swap of the sequences a and b to SC mode or OFDM mode. The technique of FIG. 27 is similar to the technique of FIG. 25, except that a different u' is utilized. FIG. 28 illustrates another technique whereby the selection of a and b sequences in STF indicates different modes of transmission (e.g., an SC mode or an OFDM mode). FIG. 28 is similar to the technique of FIG. 26, except that a different u' is utilized.

Figure 29:
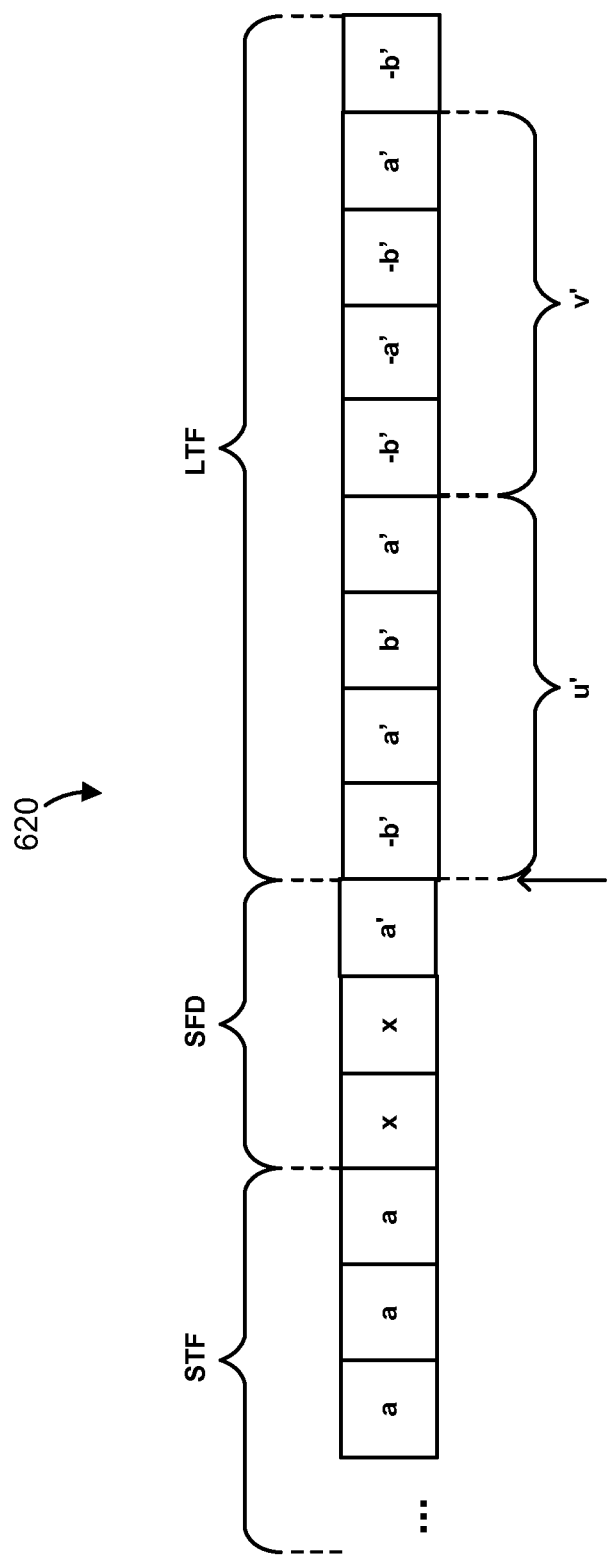
FIG. 29 is a block diagram of an efficient PHY preamble in which an SFD sequence between the STF and LTF fields indicates the selection of a PHY communication mode.

As yet another approach, PHY mode selection (or selection of other operational parameters of the PHY layer or possibly other layers) may be signaled by including an explicit SFD field between the STF and LTF fields, and by altering various parameters of SFD. FIG. 29 is an example PHY preamble format 620 in which a PHY mode or parameter may be indicated via cover codes in SFD, by applying particular complementary sequences a, b (e.g., complementary Golay codes) within SFD, or by various combinations of these techniques. For example, LTF may utilize complementary sequences a' and b', and the last period of SFD may utilize the sequence complementary to the sequence of the first period of LTF. Meanwhile, STF may be utilize another sequence such as a. Thus, the PHY preamble 620 may use more than a single pair of complementary sequences. Generally speaking, it is possible to use any suitable sequences in STF in all but the last period of SFD, as long as the boundary between SFD and LTF is clearly signaled by a pair of complimentary sequences. Thus, STF may use one or two of the sequences a and b utilized in LTF, one or both sequences a' and b' corresponding to cyclically shifted respective sequences a and b, or one or several other sequences (e.g., c, d, etc.) independent of the sequences a and b, i.e., not equal to or derived from the sequences a or b.

Figure 30:
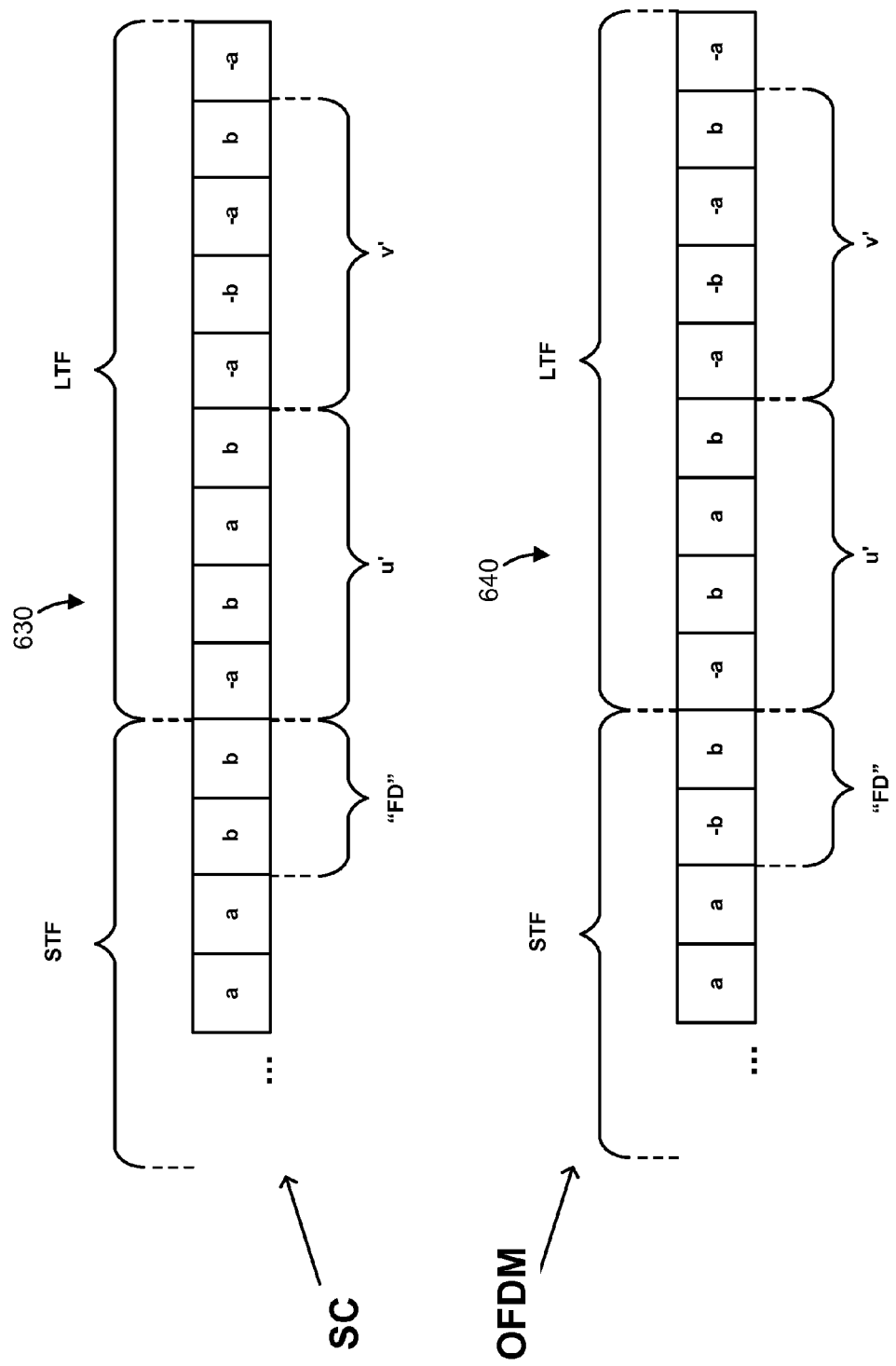
FIG. 30 is a block diagram of a PHY preamble format in which a cover code applied to the STF field indicates the selection of a PHY communication mode (e.g., SC mode or OFDM mode)
Figure 31:
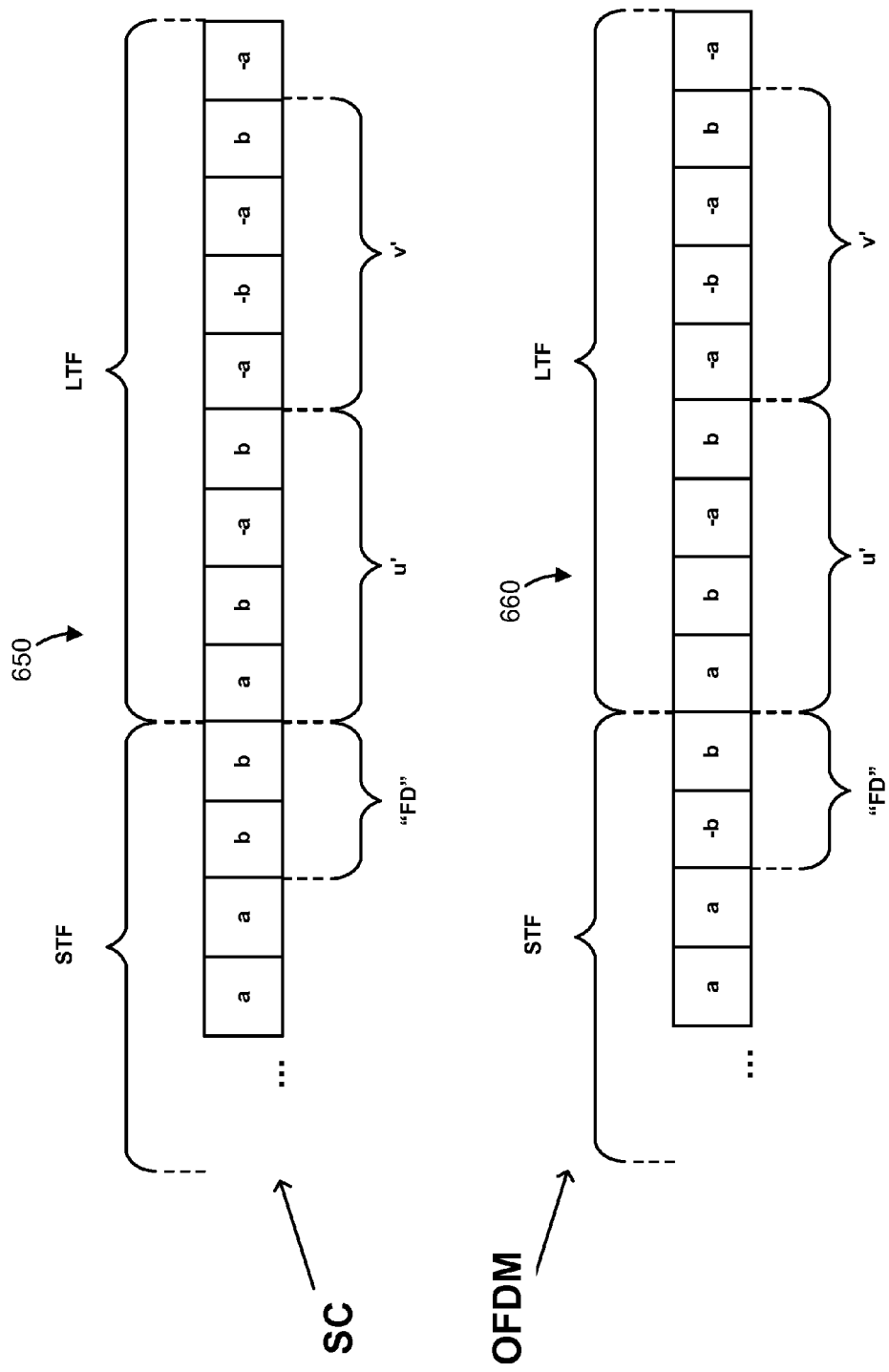
FIG. 31 is a block diagram of another PHY preamble format in which a cover code applied to the STF field indicates the selection of a PHY communication mode (e.g., SC mode or OFDM mode)

FIG. 30 illustrates one example technique of using SFD to indicate two or more physical PHY modes. For ease of illustration, the frame delimiter field (FD) is illustrated in FIG. 30 as the last part of STF in each of the PHY preambles 630 and 640. To signal between SC and OFDM without altering u' and v', a pattern [b b] can be used for SC and another pattern [−b b] can be used for OFDM. It will be noted that in each of these two cases, the last period of FD is a sequence complimentary to the sequence used in the first period of LTF, thus signaling the STF/LTF boundary. In general, the FD sequence used as the last part of the STF may include any desired number of periods, and the selection of SC or OFDM may be signaled using different cover codes. As another example, FIG. 31 illustrates PHY preambles 650 and 660 that use another CES symbol u' but otherwise are to the same as the preambles of FIG. 30.

Figure 32:
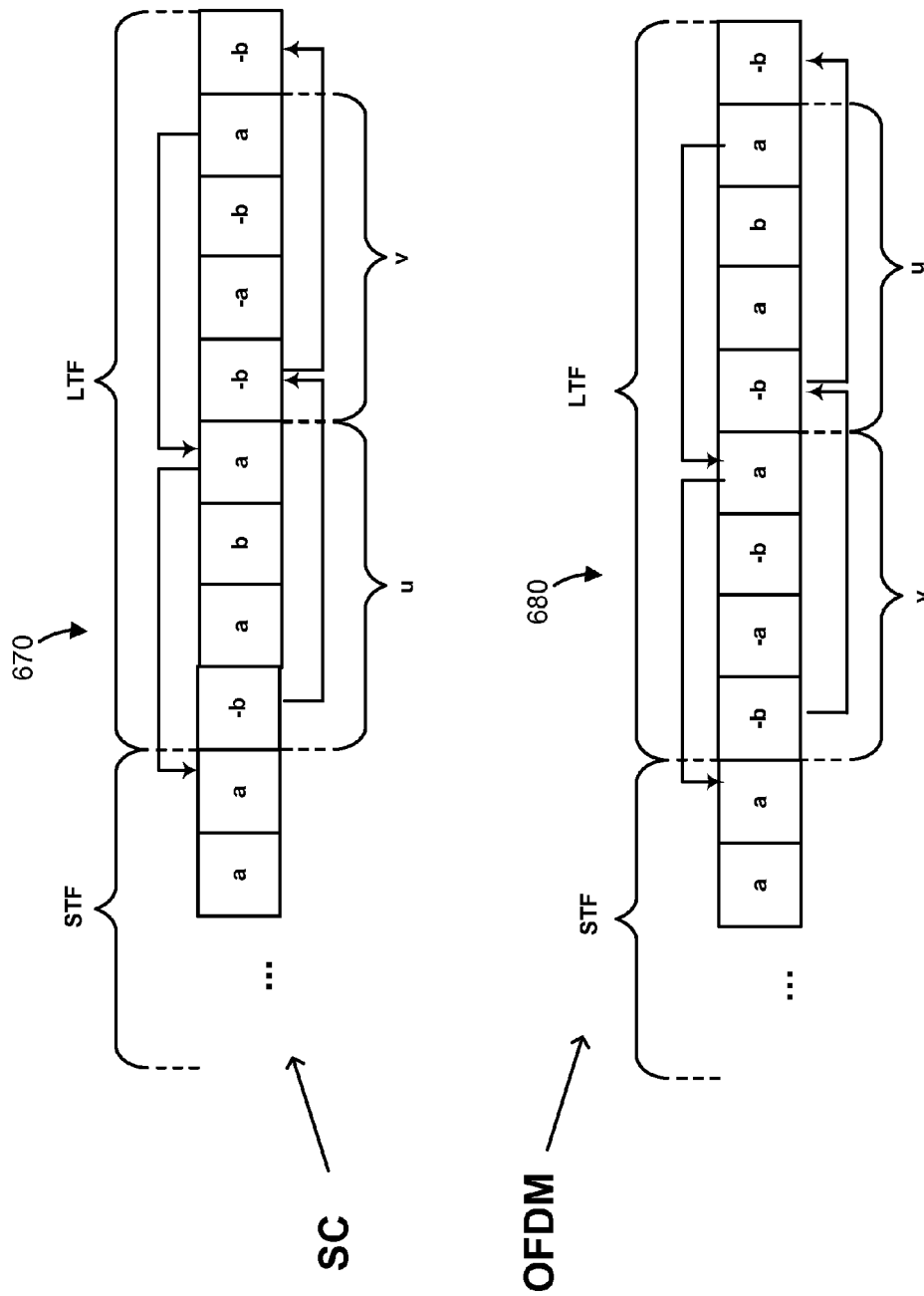
FIG. 32 is a block diagram of an PHY preamble format in which the order of CES symbols indicates the selection of a PHY communication mode (e.g., SC mode or OFDM mode)

Next, FIG. 32 illustrates a method of indicating operational parameters such as SC/OFDM selection by altering the relative order of CES symbols in LTF. As illustrated in FIG. 32, a PHY preamble 670 includes a CES symbol u transmitted immediately before another CES symbol v. On the other hand, a PHY preamble 680 includes the CES symbol v immediately preceding the CES symbol u. In this embodiment, STF of the PHY preamble 670 and 680 is the same. Thus, the PHY preambles 670 and 680 are identical except for the ordering of the CES symbols in LTF. Further, u and v in this particular example are selected so as to provide cyclic prefixes and postfixes in the corresponding first and last parts of the other CES symbol. Specifically, each of the u and v symbols includes −b in the first period and a in the last period. Thus, the first part (period) of u or v may serve as a cyclic postfix of the other CES symbol u or v, and the last part of u or v may serve as a cyclic prefix of the other CES symbol u or v. In other embodiments, it is possible to use symbols u and v that do not have this property, and a PHY preamble that alters the ordering between u and v to signal PHY mode or other parameters accordingly may include additional periods for cyclic prefixes/postfixes.

Figure 33:
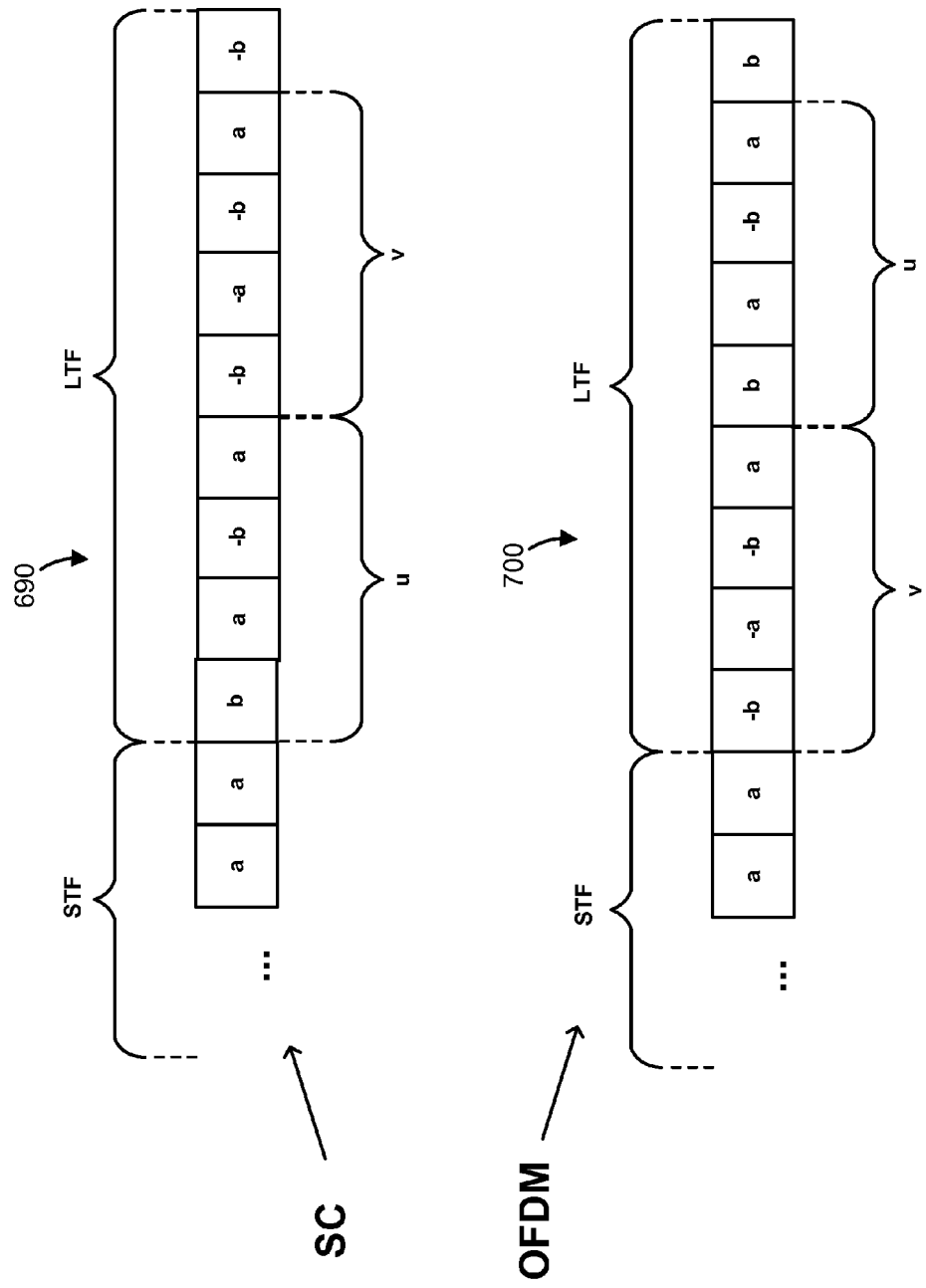
FIG. 33 is a block diagram of another PHY preamble format in which the order of CES symbols indicates the selection of a PHY communication mode (e.g., SC mode or OFDM mode)

FIG. 33 illustrates another example of PHY preambles 690 and 700 in which an ordering of u and v CES symbols indicates an SC mode or an OFDM mode. However, it will be noted that the preambles 690 and 700 omit the cyclic postfix of u, and thus may not provide the same ISI protection as the example of FIG. 33.

It will be further noted that in at least some embodiments, it may be desirable to indicate other information in the PHY preamble. For example indicating a piconet ID may allow the receiving device associated with a particular piconet to process data frames in that piconet and ignore, for example, data frames in other piconets. To this end, multiples pairs of Golay complementary sequences $a_i$, $b_i$ (or other suitable sequences) may be defined, and the selection of a certain pair ($a_i$, $b_i$) in the STF, the LTF, or both may signal the piconet identity. For example, the pair $a_1$, $b_1$ may indicate piconet ID 1, the pair $a_2$, $b_2$ may indicate piconet ID 2, etc.

Additionally or alternatively, cover codes in STF may signal piconet identity. If desired, a single pair of Golay complementary sequences a, b may be used for all piconets in this case. For example, the cover code $c_1$=(1 1 1 1) may indicate piconet ID 1, the cover code $c_2$=(1 −1 1 −1) may indicate piconet ID 2, etc.

Moreover, combinations of a/b selections with cover codes in STF may efficiently signal PHY modes, header rates, piconet identity, and other operational parameters, possibly signaling multiple parameters at the same time. For example, each of the four-period cover codes (1 1 1 1), (1 −1, 1, −1), (−1, 1, −1, 1), (1, j, −1, −j) and (1, −j, −1, j) may signal a particular unique selection of a piconet identity, SC or OFDM mode, header rate, etc. In PSK modulation schemes, for example, each cover code defines a set of phase shifts. By selectively applying each of these cover codes to the sequence a or b, a transmitting device may communicate even more parameters to the receiving device.

Figure 34:
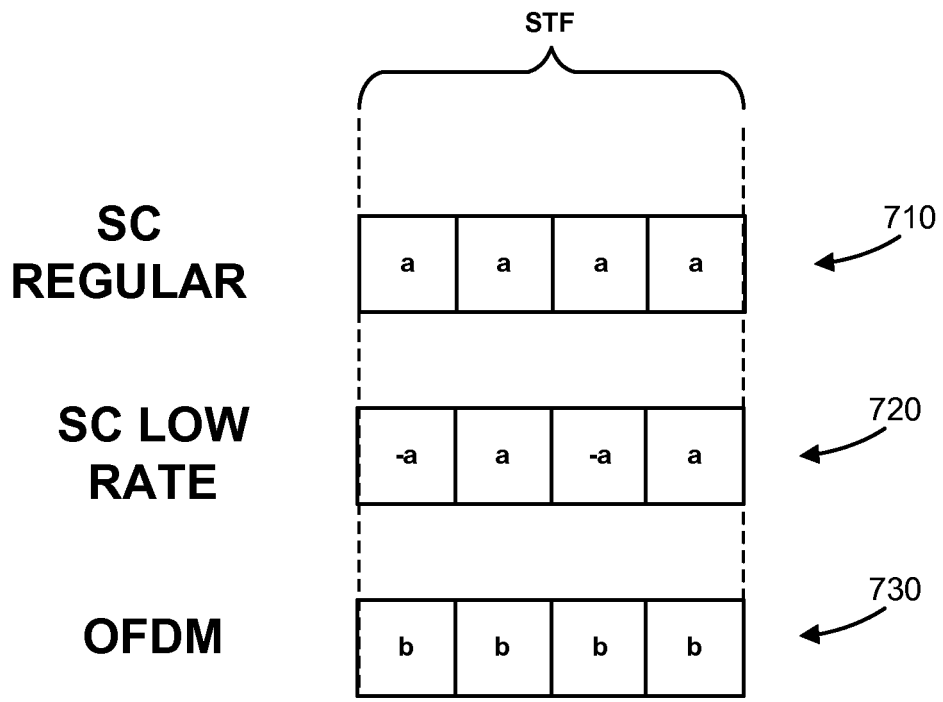
FIG. 34 is a block diagram of several example STF codes in which the selection of a sequence and a cover code indicates the selection of a PHY communication mode (e.g., SC Regular mode, SC Low Rate mode, or OFDM mode)

FIG. 34 illustrates a simple example of applying a length-four cover code to STF along with a particular selection of a or b sequence to signal between SC regular, SC low rate common mode, or OFDM. The STF format 710 uses the sequence a along with a cover code (1, 1, 1, 1) to define an STF sequence pattern [a, a, a, a]. The STF format 720 uses the same sequence a along with a cover code (−1, 1, −1, 1) to define an STF sequence pattern [−a, a, −a, a]. Finally, the STF format 730 uses the sequence b along with a cover code (1, 1, 1, 1) to define an STF sequence pattern [b, b, b, b]. Although any association between the formats 710-730 and operational parameters are possible, the example illustrated in FIG. 34 maps the format 710 to the tuple {SC, regular header rate}, the format 720 to the tuple {SC, low header rate}, and the format 730 to OFDM. Of course, this technique may also be applied to signaling piconet identity, a combination of piconet identity with SC/OFDM, or other PHY layer parameters.

Figure 35:
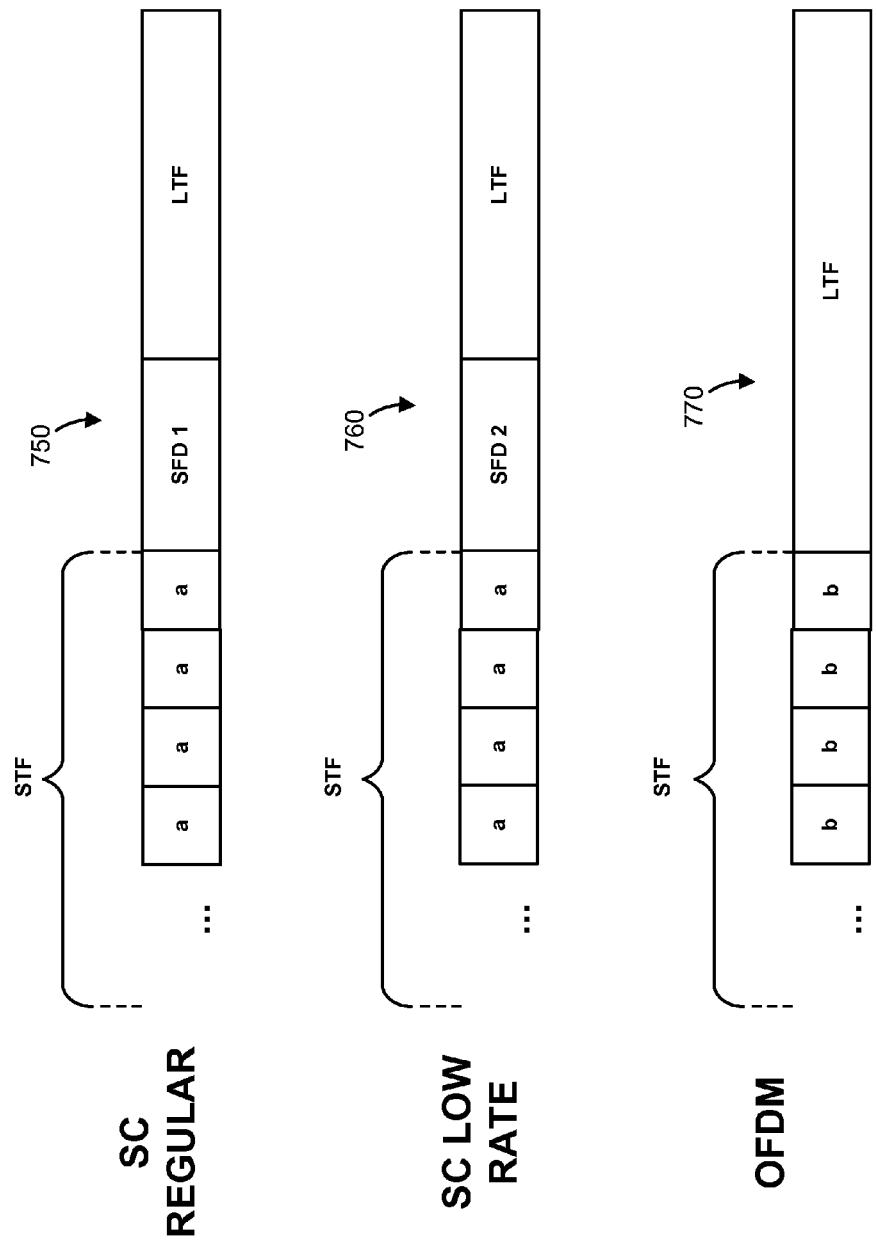
FIG. 35 is a block diagram of a PHY preamble format in which the selection of one of sequences in the STF, and selection of SFD fields signals the selection of a PHY communication mode (e.g., SC Regular mode, SC Low Rate mode, or OFDM mode)

Referring to FIG. 35, a combination of a/b selection in STF, along with a particular SFD format, may also signal operational parameters of the PHY layer. In this example, the PHY preambles 750 and 760 may share the same STF but may differ in their respective SFD fields. The SFD fields may, for example, be of a different length or may use different cover codes or different sequences, etc. Meanwhile, the PHY preamble 770 for use in OFDM uses a different spreading sequence in each period of STF. A receiving device may first select between SC and OFDM by correlating the STF field with a or b and, in the event that the STF field correlates with a, further process the subsequent SFD field to determine whether the PHY preamble is associated with regular or low header rate.

Figure 36:
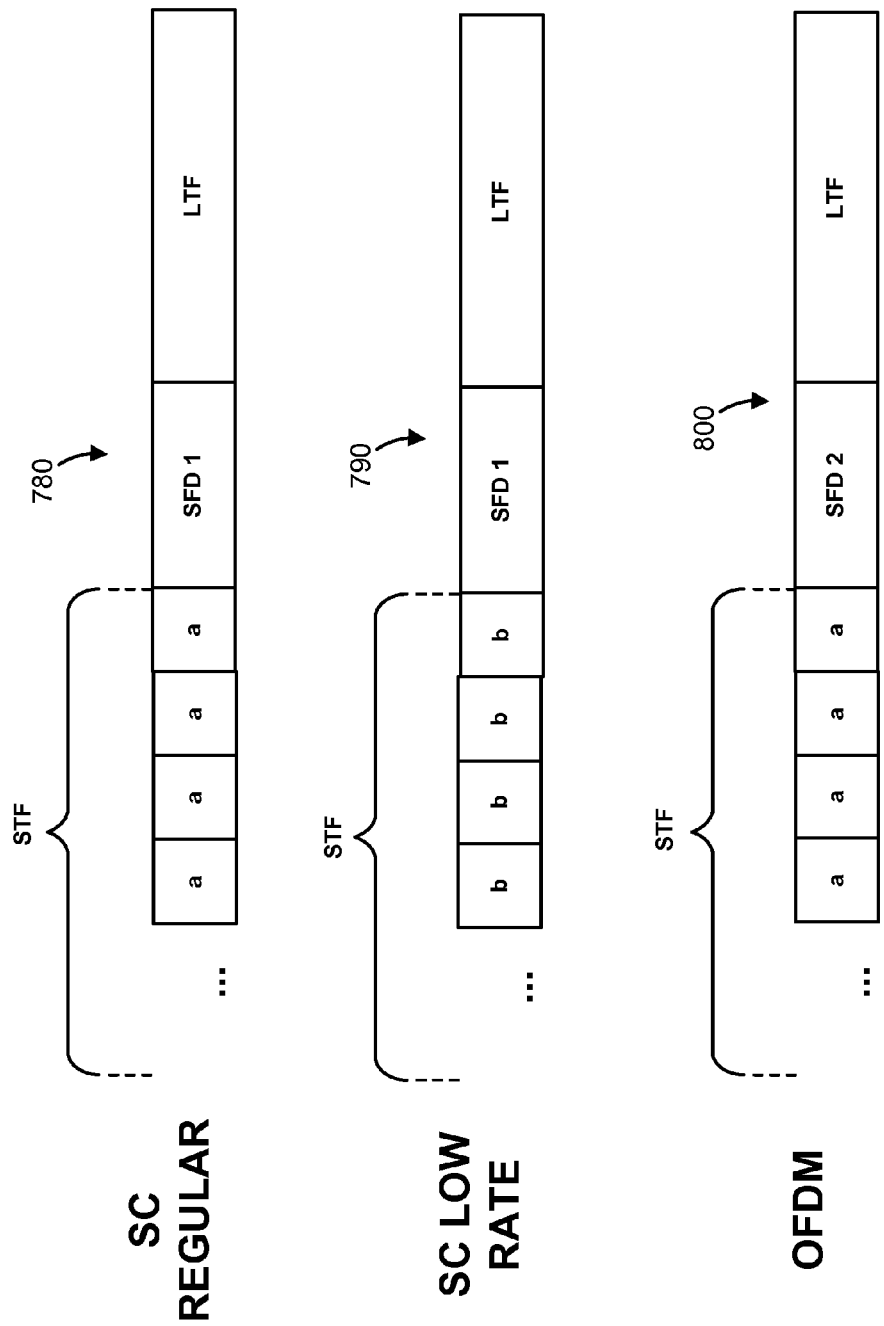
FIG. 36 is a block diagram of a PHY preamble format in which selection of sequences in the STF field and the pattern in the SFD field indicates the selection of a PHY communication mode (e.g., SC Regular mode, SC Low Rate mode, or OFDM mode)

FIG. 36 illustrates an approach similar to the one illustrated in FIG. 35, except that the header rate in PHY preambles 780, 790, and 800 is indicated by the spreading sequence in STF. Meanwhile, SC/OFDM selection is indicated by the SFD field. As in the examples discussed above, the SFD field can be spread using particular sequences, transmitted using different cover codes, varied in length, or otherwise altered to distinguish between various modes of operation.

Figure 37:
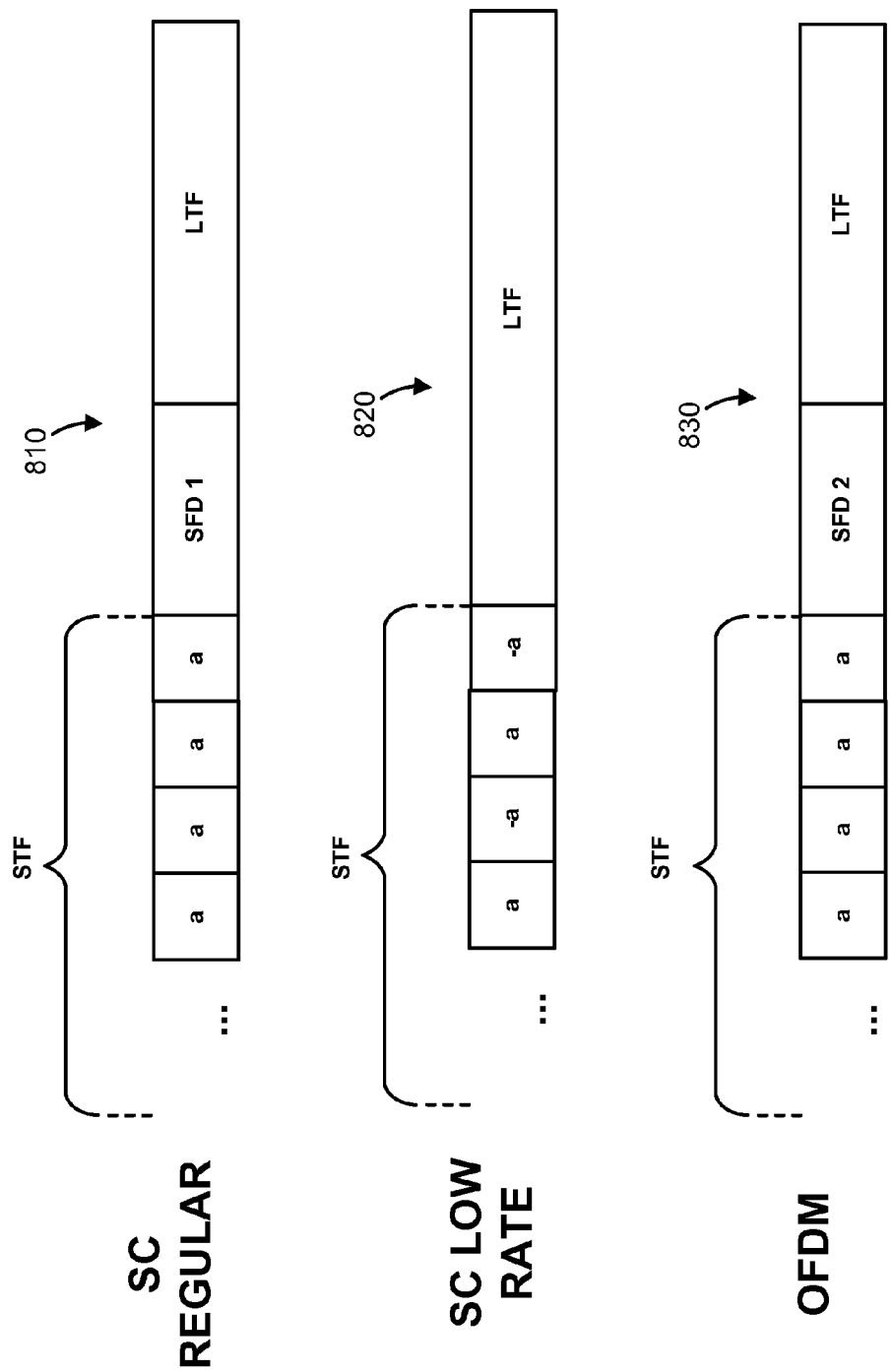
FIG. 37 is a block diagram of a PHY preamble format in which cover codes in the STF and SFD fields indicate the selection of a PHY communication mode (e.g., SC Regular mode, SC Low Rate mode, or OFDM mode)

Now referring to FIG. 37, a combination of cover codes in STF and variations in the SFD field can be similarly used to indicate parameters such as PHY mode. In PHY preambles 810, 820, and 830, STF is spread using the same sequence a but the cover codes in at least one of the PHY modes are different in STF. For the two remaining modes whose cover codes in STF are identical, variations in SFD may provide further differentiation.

Figure 38:
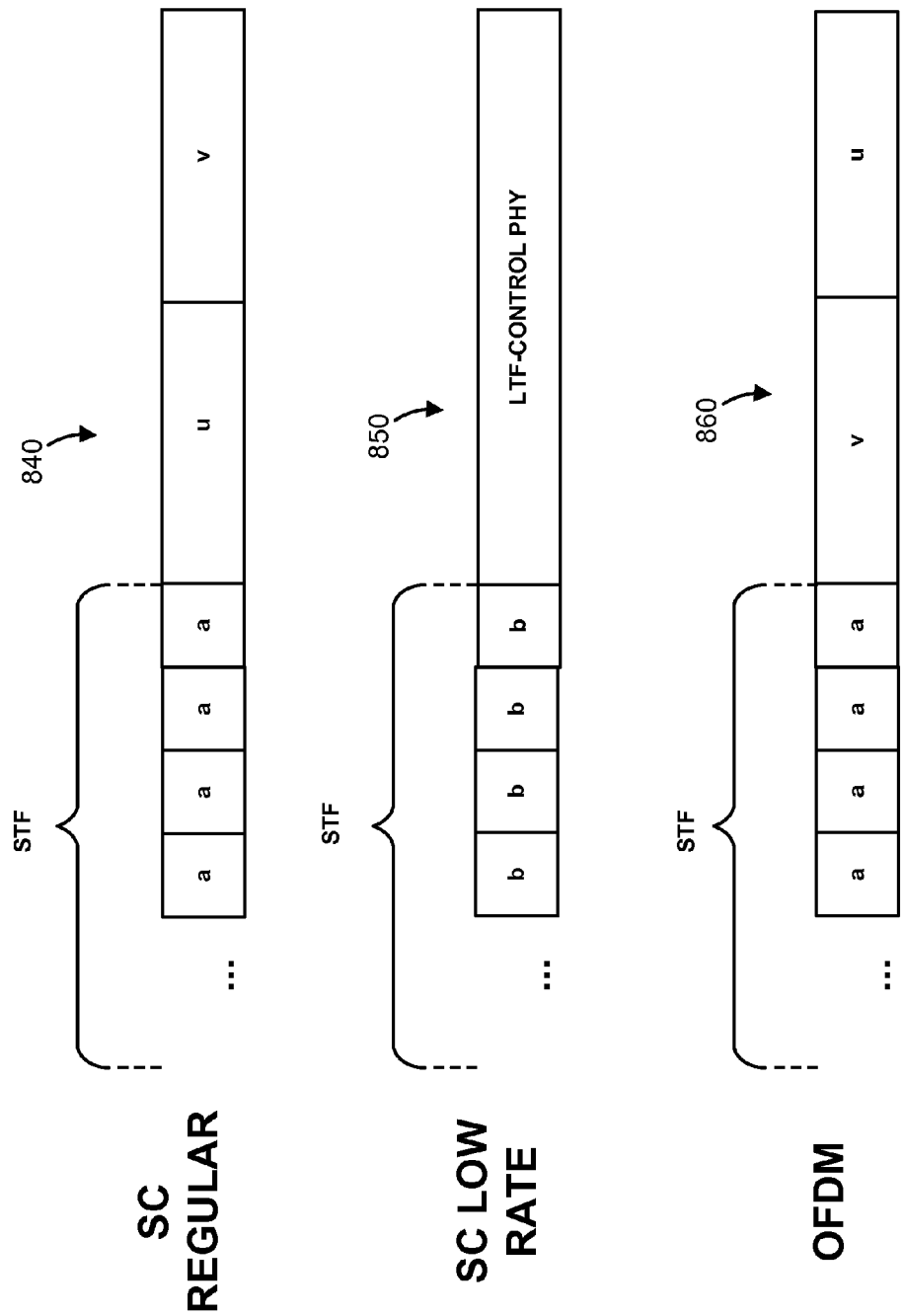
FIG. 38 is a block diagram of a PHY preamble format in which the selection of a sequence in the STF field and the order of CES training symbols indicates the selection of a PHY communication mode (e.g., SC Regular mode, SC Low Rate mode, or OFDM mode)

Further, the technique illustrated in FIG. 38 with respect to PHY preambles 840, 850, 860 relies on ordering of u and v in LTF as well as on a selection of spreading codes a and b in STF. Thus, the use of the sequence a in STF in combination with the ordering {u, v} may signal one PHY mode/rate configuration (e.g. SC regular). On the other hand, the use of the same sequence with a different ordering of u and v, for example, may signal a second PHY mode/rate configuration (e.g. OFDM). Finally, the use of the spreading sequence b in STF may signal the third PHY mode/rate configuration (e.g. SC low rate). It will be also noted that for SC low rate common mode, the length of LTF may be shorter than the length of LTF of the PHY preamble used in SC regular (as illustrated in FIG. 39).

Referring again to FIG. 6, a preamble processor, such as the preamble processor 92 may generally process a received signal to detect data frames, detect a start of an LTF field, and determine PHY parameters by analyzing the PHY preamble using techniques such as described above. For example, the STF/LTF boundary detector 260 can detect the start of the LTF boundary based on detecting a change from a plurality of a sequences to a b sequence, or a change from a plurality of b sequences to an a sequence. The PHY preamble decoder 264 can determine PHY parameters such as a modulation mode, a piconet ID, a header rate, etc., based on one or more of 1) determining whether an a or b sequence is utilized in the STF; 2) determining an order of u and v or u' and v' sequences in the LTF; and 3) determining cover codes in the STF, the LTF, and/or an SFD.

Figure 40:
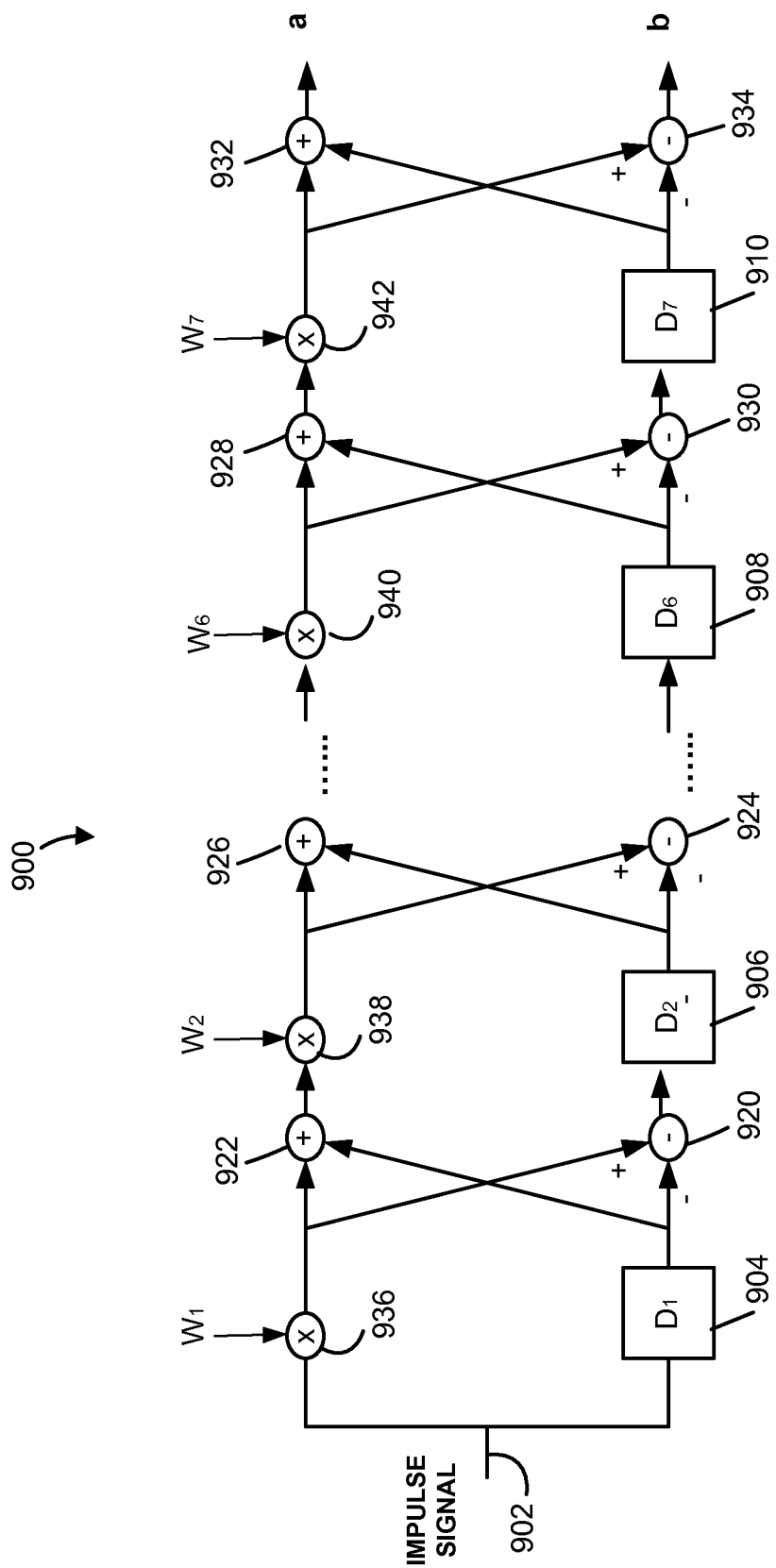
FIG. 40 is a block diagram of a Golay code generator that generates efficient Golay sequences for use by devices illustrated in FIG. 1.

Next, FIG. 40 illustrates one example of a generator 900 that generates a pair of complementary Golay sequences a and b in response to an impulse signal [1 0 0 . . . ] using a length-seven weight vector W such as in (1) and a length-seven delay vector D such as in (2), (5) or (8). As illustrated in FIG. 40, the generator 900 may include an input 902, delay elements 904-910, adders/subtractors 920-934, and multipliers 936-942. Each value in the weight vector W, given by (1) for example, is mapped to one of the inputs of a corresponding multiplier 936-942. For the weight vector given by (1), $W_1=1$ is assigned to the multiplier 936, $W_2=1$ is assigned to the multiplier 938, $W_6=1$ is assigned to the multiplier 940, $W_7=-1$ is assigned to the multiplier 942, etc. The values of the delay vector D given by (2), to take one example, are assigned to the delay elements 904-910: $D_1=1$ is assigned to the delay element 904, $D_2=2$ is assigned to the delay element 906, etc. The elements of the generator 900 are interconnected as illustrated in FIG. 40 to generate the Golay sequences a and b given by (3) and (4) in response to the vectors D and W considered in this example. Similarly, the generator 900 generates Golay sequences given by (6) and (7) in response to the weight vector W given by (1) and the delay vector D given by (5). Although the transmitting device 12 may include the generator 900, store the desired vectors D and W in a memory unit, and apply the vectors D and W to the generator 900 to generate the sequences a and b, it is contemplated that the transmitting device 12 preferably stores two or more pairs of sequences a and b in memory for quicker application in spreading bits and/or generating PHY preambles.

Figure 41:
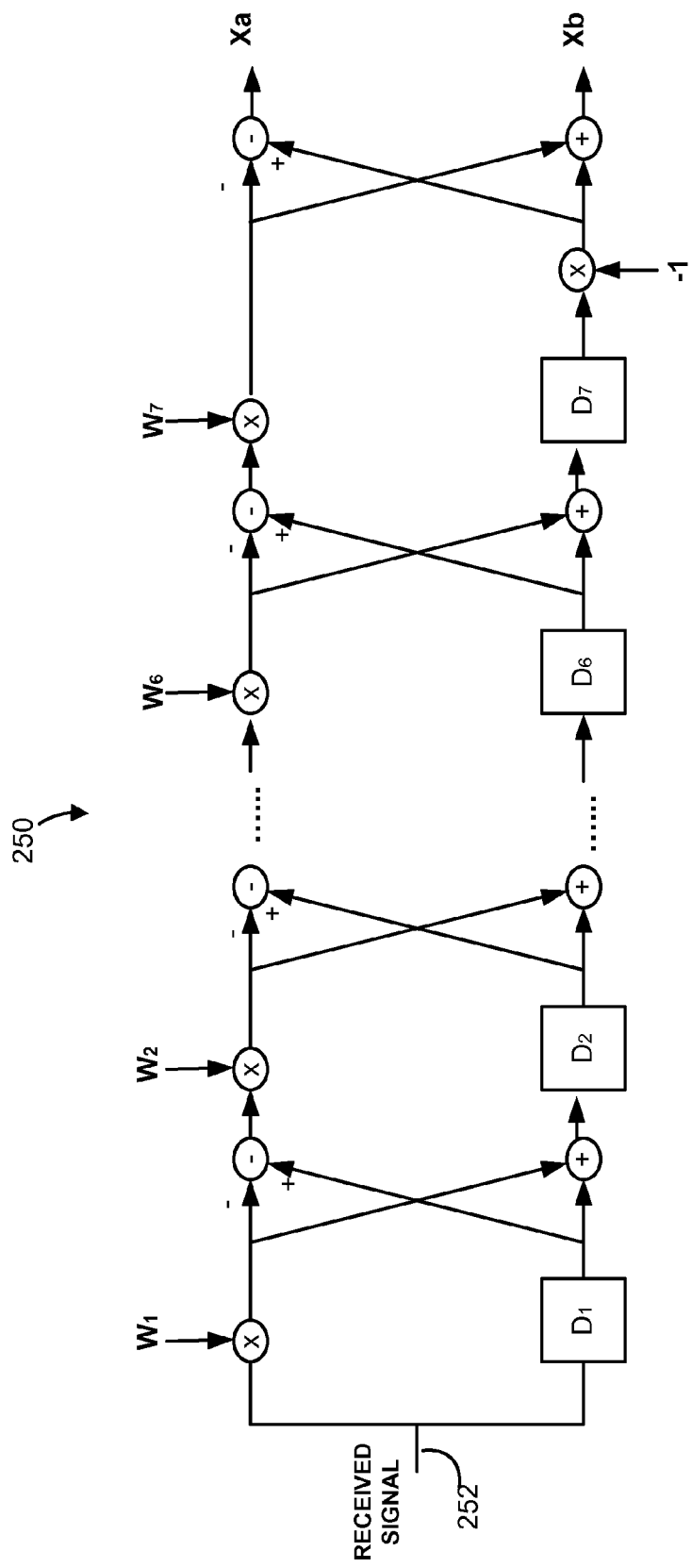
FIG. 41 is a block diagram of a correlator for correlating with Golay sequences.

On the other hand, the receiving device 14 may implement the correlator 250 illustrated in FIG. 6 and again, in greater detail, in FIG. 41. The correlator 250 has a structure generally similar to the structure of the generator 900. However, to generate a correlation output between complementary Golay sequences a and b (determined by vectors D and W), the correlator 250 "flips" the adders and subtractors of the generator 900 (i.e., replaces adders with subtractors, and subtractors with adders) and multiplies the output of the delay element to which $D_7$ is assigned by $-1$. In general, other designs of the correlator 250 are possible. However, it will be appreciated that the example architecture illustrated in FIG. 41 implements the correlator as filter with impulse responses which can be expressed as the reversal of the chip ordering within the sequences a and b, or $a_{rev}$ and $b_{rev}$, respectively.

Figure 42:
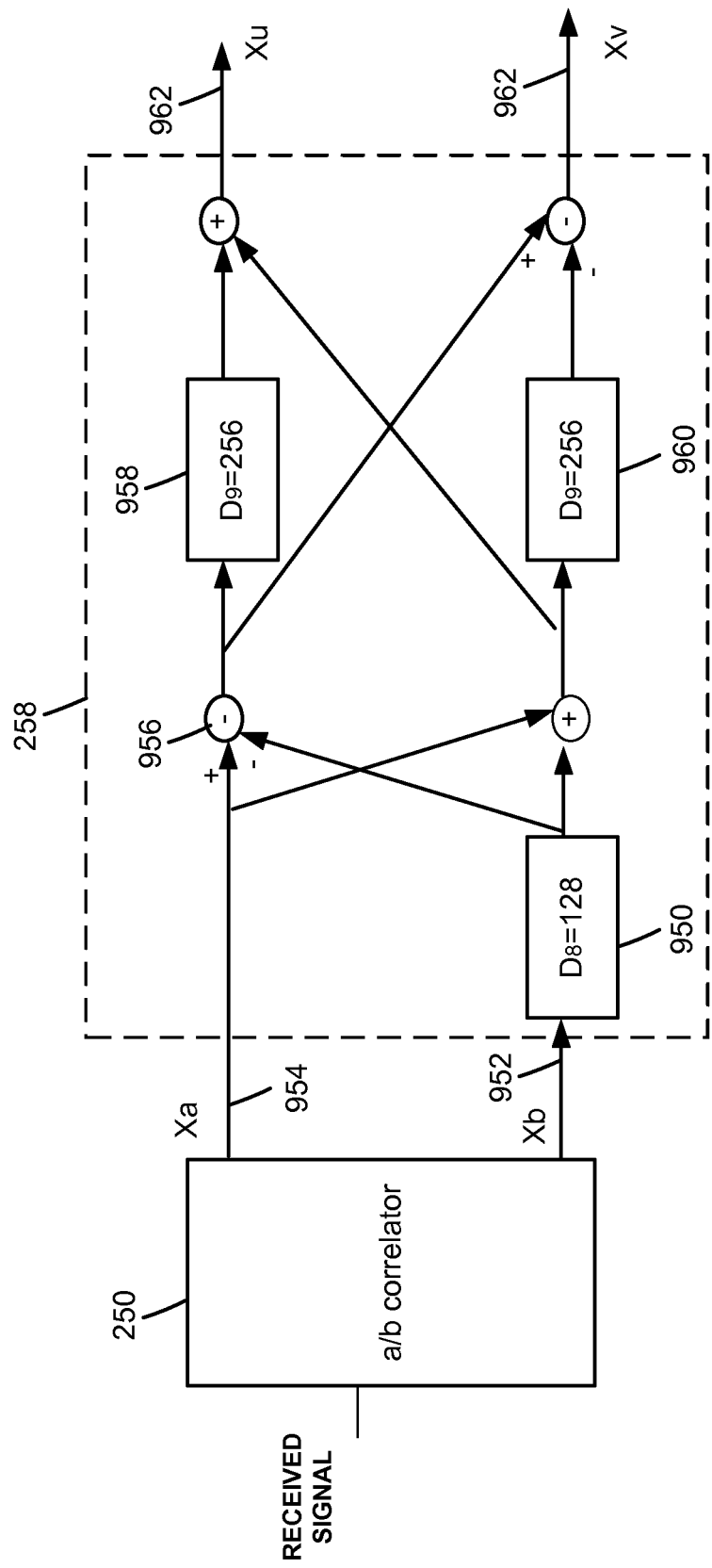
FIG. 42 is a block diagram of a correlator for use with the PHY preamble illustrated in FIG. 15 and that incorporates the correlator of FIG. 41.

Further, the a/b correlator 250 illustrated in FIG. 41 may be efficiently utilized in cooperation with the u/v correlator 258 (see FIG. 6). FIG. 42 illustrates one embodiment of the u/v correlator 258 that detects u/v correlation for u=[−b a b a] and v=[−b −a −b a]. In this example, a delay element 950 with a delay of 128 is connected to the b correlation output 952 (see diagram 312 in FIG. 7 for one example of a cross-correlation output (XCORR B) between b and an input signal), a subtractor 956 is connected to the a correlation output 954, etc. Delay elements 958 and 960, and several additional adders and subtractors provide u/v correlation. Of course, the factors in the delay elements 950, 958, and 960 may be adjusted if the sequences a and b of lengths other than 128 chips are used. The u/v correlator 258 may generate cross-correlation outputs 962 and 964 corresponding to cross-correlation between the received signal and sequences u and v, respectively.

Figure 43:
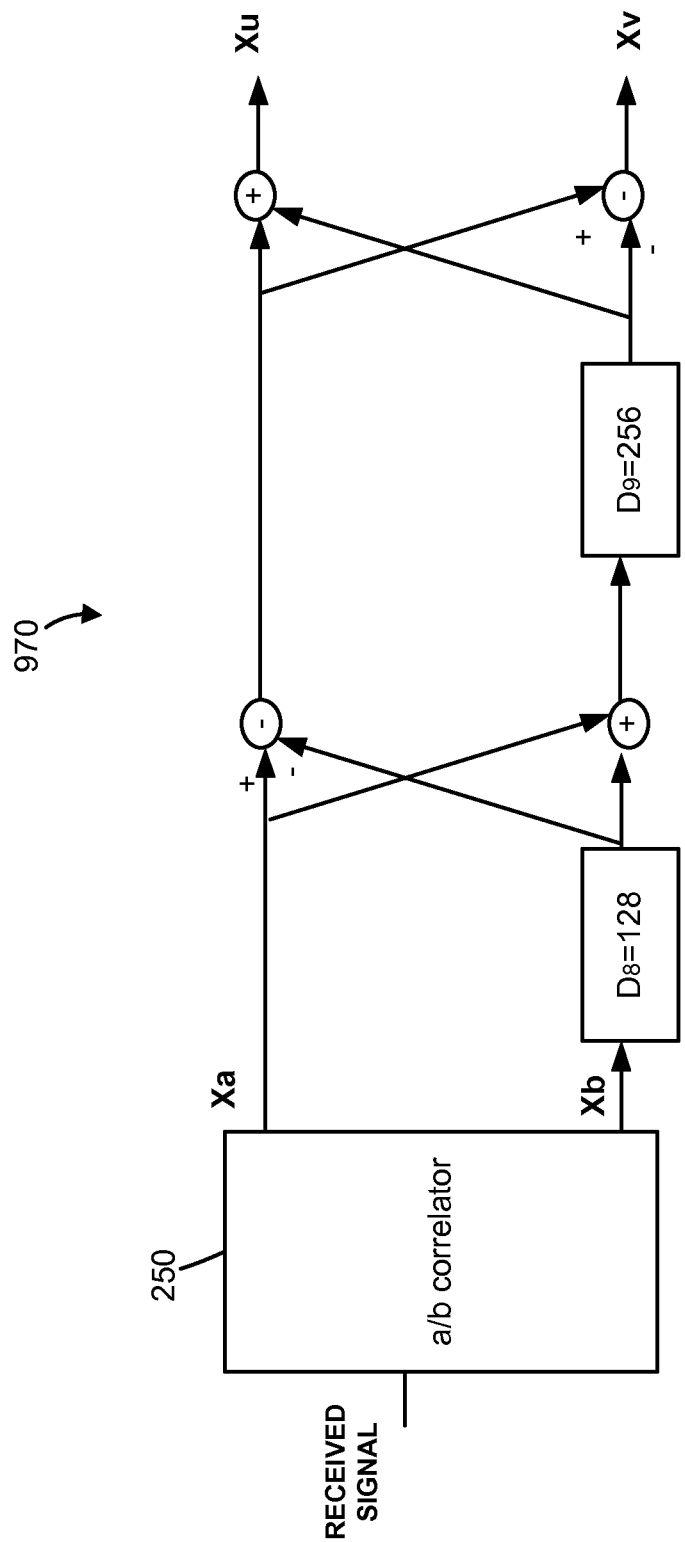
FIG. 43 is a block diagram of a correlator for use with the PHY preamble illustrated in FIG. 18 and that incorporates the correlator of FIG. 41.

It will be noted that the u/v correlator 258 efficiently uses the correlation output generated by the a/b correlator 250, and requires only several additional components to correlate sequences u or v. It will be further appreciated that a u/v correlator for other sequences u and v may be similarly constructed. As one example, a u/v correlator 970 illustrated in FIG. 43 generates cross-correlation output between the received signal and sequences u=[b a −b a] and v=[−b −a −b a]. As in the example illustrated in FIG. 42, the u/v correlator 970 efficiently uses the output of the a/b correlator 250.

As discussed above, certain CES symbols u and v in LTF allow the PHY preamble to efficiently communicate PHY level parameters using fewer periods as compared to prior art PHY preambles. The following examples illustrate further techniques of developing efficient u and v sequences for use in LTF. If STF is transmitted using repetitions of the sequence a, let $$u_1 = [c_1 b\ c_2 a\ c_3 b\ c_4 a] \quad (12)$$

and let $$v_1 = [c_5 b\ c_6 a\ c_7 b\ c_8 a], \quad (13)$$

where each of $c_1$-$c_8$ is +1 or −1. To make $u_1$ and $v_1$ more efficient, use $$c_4 = c_8 \quad (14)$$

and, preferably, $$c_1 = c_5. \quad (15)$$

The rest of the symbols $c_2$, $c_3$, $c_5$, and $c_7$ should be selected so as to make $u_1$ and $v_1$ complementary. It will be noted that other sequences u and v can be used in at least some of the embodiments discussed above. However, if conditions (14) and (15) are met, LTF can be made shorter at least because adjacent sequences u and v provide each other with cyclic prefixes and/or postfixes. Further, the complementary sequences $u_1$ and $v_1$ may be efficiently used with another pair of complementary sequences $u_2$ and $v_2$ so that a transmitting device may construct a PHY preamble using the pair $\{u_1, v_1\}$ or $\{u_2, v_2\}$, and the selection of one of these two pairs of sequences may communicate one or several operational parameters to the receiving device (e.g., SC or OFDM communication mode, header rate, etc.). In the case where STF unconditionally has multiple repetitions of the sequence a, the second pair of CES symbols may be defined similarly to $\{u_1, v_1\}$:

$$u_2 = [d_1 b\ d_2 a\ d_3 b\ d_4 a] \quad (16)$$

$$v_2 = [d_5 b\ d_6 a\ d_7 b\ d_8 a], \quad (17)$$

where each of $d_1$-$d_8$ is +1 or −1, where preferably $$d_4 = d_8 \quad (18)$$

and, also preferably, $$d_1 = d_5. \quad (19)$$

To enable the receiving device to distinguish between $\{u_1, v_1\}$ and $\{u_2, v_2\}$, the sequences $c_1 c_2 \ldots c_8$ and $d_1 d_2 \ldots d_8$ should not be the same.

In another embodiment, STF is transmitted using repetitions of either a or b. The pair of sequences $\{u_1, v_1\}$ may then be defined according to (12)-(14), and $\{u_2, v_2\}$ may then be defined as:

$$u_2 = [d_1 a\ d_2 b\ d_3 a\ d_4 b] \quad (20)$$

$$v_2 = [d_5 a\ d_6 b\ d_7 a\ d_8 b], \quad (21)$$

where each of $d_1$-$d_8$ is +1 or −1; where, preferably, conditions (18) and (19) are also met; and where the rest of the symbols $d_2$, $d_3$, $d_5$, and $d_7$ make $u_2$, $v_2$ complementary. It at least some of the cases consistent with this approach, $u_2$ can be derived form $u_1$, and $v_2$ can be derived from $v_1$. Alternatively, $u_2$ can be derived form $v_1$, and $v_2$ can be derived from $u_1$.

To consider some specific examples, $\{u_1, v_1\}$ may be defined according to (12) and (13), and $\{u_2, v_2\}$ may be defined as:

$$u_2 = m[c_2 a\ c_3 b\ c_4 a\ c_1 b] \quad (22)$$

$$v_2 = m[c_6 a\ c_7 b\ c_8 a\ c_5 b], \quad (23)$$

where m is +1 or −1.

As another example, in which $\{u_1, v_1\}$ is still provided by (12) and (13), $\{u_2, v_2\}$ can be defined as:

$$v_2 = m[c_2 a\ c_3 b\ c_4 a\ c_1 b] \quad (24)$$

$$u_2 = m[c_6 a\ c_7 b\ c_8 a\ c_5 b], \quad (25)$$

where m is +1 or −1. It will be noted that this definition corresponds to "swapping" definitions for $u_2$ and $v_2$ provided by (22) and (23).

As yet further examples in which the definition of $\{u_1, v_1\}$ is consistent with (12) and (13), and where m is +1 or −1, $\{u_2, v_2\}$ may be given by:

$$u_2 = m[c_4 a\ c_1 b\ c_2 a\ c_3 b], \quad (26)$$

$$v_2 = m[c_8 a\ c_5 b\ c_6 a\ c_7 b], \quad (27)$$

or $$v_2 = m[c_4 a\ c_1 b\ c_2 a\ c_3 b], \quad (28)$$

$$u_2 = m[c_8 a\ c_5 b\ c_6 a\ c_7 b], \quad (29)$$

or $$u_2 = m[c_2 a\ c_3 b\ c_4 a\ c_1 b], \quad (30)$$

$$v_2 = m[c_8 a\ c_5 b\ c_6 a\ c_7 b], \quad (31)$$

or $$v_2 = m[c_2 a\ c_3 b\ c_4 a\ c_1 b], \quad (32)$$

$$u_2 = m[c_8 a\ c_5 b\ c_6 a\ c_7 b], \quad (33)$$

or $$u_2 = m[c_4 a\ c_1 b\ c_2 a\ c_3 b], \quad (34)$$

$$v_2 = m[c_6 a\ c_7 b\ c_8 a\ c_5 b], \quad (35)$$

or $$v_2 = m[c_4 a\ c_1 b\ c_2 a\ c_3 b], \quad (36)$$

$$u_2 = m[c_6 a\ c_7 b\ c_8 a\ c_5 b], \quad (37)$$

As indicated above, the use of STF patterns, SFD patterns, CES symbols, a/b sequences, etc., as well as various combinations of these parameters may advantageously serve as an indication of one or PHY layer parameters associated with the data frame. Moreover, transitions between patterns may also be used to communicate PHY layer parameters or other data to the receiving device. For example, a to −a transition between the last period of SFD and the first period in CES may indicate SC, a to −b transition may indicate OFDM, etc.

Generally regarding the discussion above, it will be understood that the terms "transmitting device" and "receiving device" merely refer to operational states of physical devices and are not intended to always limit these devices to only receiving or transmitting in the respective communication network. For example, the device 12 in FIG. 1 may operate as a receiver and the device 14 may operate as a transmitter at some point during operation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for processing a preamble of a data packet, received via a communication channel, using a pair of complementary sequences, wherein a sum of out-of-phase aperiodic autocorrelation coefficients of the pair of complementary sequences is zero, and wherein the preamble includes (i) a first field that provides synchronization information and (ii) a second field that provides channel estimation information, the method comprising:
at least one of (i) correlating a received signal corresponding to the preamble with at least one sequence of the pair of complementary sequences to generate a plurality of respective correlation signals, or (ii) autocorrelating the received signal to generate an autocorrelation signal;
determining a cover code in the preamble using at least one of (i) the plurality of respective correlation signals, or (ii) the autocorrelation signal; and
using the cover code to decode the preamble.

2. The method of claim 1, wherein the cover code is in the first field.

3. The method of claim 2, wherein the cover code indicates at least one of (i) a piconet identity, (ii) a header rate, or (iii) one of a single carrier (SC) mode or an orthogonal frequency division multiplexing (OFDM) mode.

4. The method of claim 1, wherein the cover code is in the second field.

5. The method of claim 1, further comprising determining a beginning of the second field based on the plurality of respective correlation signals or the autocorrelation signal.

6. The method of claim 1, wherein:
each of the pair of complementary sequences is a 128-chip Golay spreading sequence associated with a weight vector W and a delay vector D;
W=[1 1 −1 1 −1 1 −1]; and
D is one of [1 2 4 8 16 32 64], [64 16 32 1 8 2 4], or [64 32 16 8 4 2 1].

7. The method of claim 1, further comprising:
detecting a first channel estimation (CES) symbol in the second field; and
detecting a second CES symbol in the second field,
wherein the first CES symbol and the second CES symbol are complementary sequences.

8. The method of claim 7, wherein:
a length of each sequence of the pair of complementary sequences is an integer N; and
a length of each of the first CES symbol and the second CES symbol is at least 4N.

9. The method of claim 7, wherein:
the first CES symbol is u consistent with the format u=[$c_1$a $c_2$b $c_3$a $c_4$b];
the second CES symbol is v consistent with the format v=[$c_5$a $c_6$b $c_6$a $c_8$b];
a is a first Golay spreading sequence;
b is a second Golay spreading sequence complementary to a;
each of $c_1$, $c_2$, $c_3$, $c_4$, $c_5$, $c_6$, $c_7$, and $c_8$ is +1 or −1;
$c_4$=$c_8$; and
u and v are complementary Golay sequences.

10. The method of claim 7, wherein at least one of (i) an ending portion of the first CES symbol serves as a cyclic prefix of the second CES symbol, or (ii) a beginning portion of the second CES symbol serves as a cyclic postfix of the first CES symbol.

11. A device configured to receive, via a communication channel, a data packet having a preamble that includes (i) a first field that provides synchronization information and (ii) a second field that provides channel estimation information, the device comprising:
a processor configured to,
at least one of,
(i) correlate a received signal corresponding to the preamble with at least one sequence of a pair of complementary sequences to generate a plurality of respective correlation signals, wherein a sum of out-of-phase aperiodic autocorrelation coefficients of the pair of complementary sequences is zero, or
(ii) autocorrelate the received signal to generate an autocorrelation signal,
wherein the processor is also configured to
determine a cover code in the preamble using at least one of (i) the plurality of respective correlation signals, or (ii) the autocorrelation signal, and
use the cover code to decode the preamble.

12. The device of claim 11, wherein the cover code is in the first field.

13. The device of claim 12, wherein the cover code indicates at least one of (i) a piconet identity, (ii) a header rate, or (iii) one of a single carrier (SC) mode or an orthogonal frequency division multiplexing (OFDM) mode.

14. The device of claim 11, wherein the cover code is in the second field.

15. The device of claim 11, wherein the processor is further configured to:
determine a beginning of the second field based on the plurality of respective correlation signals or the autocorrelation signal.

16. The device of claim 11, wherein:
each of the pair of complementary sequences is a 128-chip Golay spreading sequence associated with a weight vector W and a delay vector D;
W=[1 1 −1 1 −1 1 −1]; and
D is one of [1 2 4 8 16 32 64], [64 16 32 1 8 2 4], or [64 32 16 8 4 2 1].

17. The device of claim 11, wherein the processor is further configured to:
detect a first channel estimation (CES) symbol in the second field; and
detect a second CES symbol in the second field,
wherein the first CES symbol and the second CES symbol are complementary sequences.

18. The device of claim 17, wherein:
a length of each sequence of the pair of complementary sequences is an integer N; and
a length of each of the first CES symbol and the second CES symbol is at least 4N.

19. The device of claim 17, wherein:
the first CES symbol is u consistent with the format u=[$c_1$a $c_2$b $c_3$a $c_4$b];
the second CES symbol is v consistent with the format v=[$c_5$a $c_6$b $c_6$a $c_8$b];
a is a first Golay spreading sequence;
b is a second Golay spreading sequence complementary to a;
each of $c_1$, $c_2$, $c_3$, $c_4$, $c_5$, $c_6$, $c_7$, and $c_8$ is +1 or −1;
$c_4$=$c_8$; and
u and v are complementary Golay sequences.

20. The device of claim 17, wherein at least one of (i) an ending portion of the first CES symbol serves as a cyclic prefix of the second CES symbol, or (ii) a beginning portion of the second CES symbol serves as a cyclic postfix of the first CES symbol.

* * * * *